United States Patent
Factor et al.

(10) Patent No.: US 11,995,225 B2
(45) Date of Patent: May 28, 2024

(54) SYSTEM AND METHOD OF ROBOTIC VIRTUAL REALITY FOOTWEAR

(71) Applicant: EKTO VR, Inc., Pittsburgh, PA (US)

(72) Inventors: Bradley Factor, Pittsburgh, PA (US); Robert Li, Pittsbrgh, PA (US); Antonio Garcia-Smith, Pittsburgh, PA (US)

(73) Assignee: Ekto VR, Inc., Pittsburgh, PA (US)

( * ) Notice: Subject to any disclaimer, the term of this patent is extended or adjusted under 35 U.S.C. 154(b) by 291 days.

(21) Appl. No.: 17/474,302

(22) Filed: Sep. 14, 2021

(65) Prior Publication Data

US 2022/0083129 A1    Mar. 17, 2022

Related U.S. Application Data

(60) Provisional application No. 63/077,839, filed on Sep. 14, 2020.

(51) Int. Cl.
| | |
|---|---|
| *G08B 21/00* | (2006.01) |
| *B25J 9/00* | (2006.01) |
| *B25J 13/00* | (2006.01) |
| *G06F 3/01* | (2006.01) |

(52) U.S. Cl.
CPC ............ *G06F 3/011* (2013.01); *B25J 9/0006* (2013.01); *B25J 13/006* (2013.01); *G06F 2203/012* (2013.01)

(58) Field of Classification Search
CPC .. G06F 3/011; G06F 2203/012; G06F 3/0334; B25J 9/0006; B25J 13/006
USPC ...................................................... 340/407.1
See application file for complete search history.

(56) References Cited

U.S. PATENT DOCUMENTS

| | | | |
|---|---|---|---|
| 5,963,891 A | 10/1999 | Walker et al. | |
| 6,106,397 A * | 8/2000 | Phillips | .................... G06F 3/011 |
| | | | 463/36 |
| 9,756,895 B2 | 9/2017 | Rice et al. | |
| 9,757,619 B2 | 9/2017 | Meschter et al. | |
| 9,763,489 B2 | 9/2017 | Amos et al. | |
| 2014/0262576 A1* | 9/2014 | Tuli | .......................... A43B 5/00 |
| | | | 180/181 |
| 2018/0326286 A1* | 11/2018 | Rathi | ................... A43B 5/1641 |
| 2019/0374352 A1* | 12/2019 | van der Merwe | ...... A61F 2/585 |
| 2020/0035073 A1* | 1/2020 | Cappello | ................. G06F 3/014 |

(Continued)

FOREIGN PATENT DOCUMENTS

| | | |
|---|---|---|
| WO | 2014107653 A1 | 7/2014 |
| WO | WO2014107653 A1 | 7/2014 |

*Primary Examiner* — Mark S Rushing
(74) *Attorney, Agent, or Firm* — Spilman Thomas & Battle PLLC; Shane P. Riley; William P. Smith

(57) ABSTRACT

A system, method and device for a robotic boot for wireless control in a virtual reality system. The robotic boot includes a power electronics module, controller, radio, and trackers. The robotic boot has a front drive module and a rear drive module; a boot chassis and a battery. The boot controller controls velocity and position based on virtual reality tracking data to maintain the user inside a predetermined operating space while the user is wearing the robotic boot. The method includes measuring pose data; determining if the user is outside of an area, and calculating an intended velocity of the user; calculating a motion command in response to the measured pose data and the total desired motion, and controlling drive module motors to move the user in virtual reality with the intended velocity.

12 Claims, 19 Drawing Sheets

(56) References Cited

U.S. PATENT DOCUMENTS

2020/0253320 A1* 8/2020 Guard .................... G06F 3/011
2020/0254300 A1   8/2020 Khilmanovich et al.
2022/0057424 A1* 2/2022 Bieglmayer ............ G01P 13/00

* cited by examiner

SYSTEM AND METHOD OF ROBOTIC VIRTUAL REALITY FOOTWEAR

CROSS-REFERENCE TO RELATED PATENT APPLICATIONS

This patent application claims the benefit of and priority to U.S. Provisional Patent Application Ser. No. 63/077,839 filed Sep. 14, 2020, entitled "SYSTEM AND METHOD OF ROBOTIC VIRTUAL REALITY", which is hereby incorporated in its entirety.

BACKGROUND

Continuity of virtual reality (VR) experiences and the associated immersion is limited by the physically available space, or VR workspace, which tends to be around 10 feet by 10 feet. The most immersive experiences do not require the user to virtually move outside of the VR workspace, but this necessarily limits the size of the explorable virtual environment. The most common current software-based VR locomotion technique is teleportation, where the user points at a virtual location and upon confirmation is instantaneously virtually moved to this new location. While this technique is unlikely to cause motion sickness, it is not intuitive and can be very disorienting, substantially decreasing immersion at each activation.

The next most common current software-based VR locomotion technique is smooth locomotion, where the user virtually glides in a direction and at a speed that they indicate. This locomotion technique is fairly intuitive, but has a very high incidence of motion sickness for users. Many variations of this technique include walking in place and arm swinging.

If a large physical space like a gymnasium or warehouse is available, one current technique is to expand the VR workspace, but this incurs additional costs for tracking hardware, computing hardware, and the space itself. In addition, the physical space limitation, and associated discontinuities, still exist, they're just encountered with a lower frequency.

There is currently a number of emerging hardware-based VR locomotion techniques including active omnidirectional treadmills, active bidirectional treadmills with redirected walking, standing passive treadmills/slipmills, and standing and seated passive wearables. The key elements to an effective VR locomotion technique include: that locomotion feels fully immersive, i.e. the user has presence and agency in the virtual environment; locomotion feels natural and therefore intuitive, i.e. moving around in the virtual environment is close enough to doing so in the real life that there is minimal required learning for the user; it ensures visual and vestibular alignment to eliminate this cause of cybersickness, i.e. virtual reality related motion sickness; and it is no more burdensome to deploy and use than a VR system.

Active hardware-based VR locomotion techniques are generally the most effective currently, but are inherently limited by reasonable physical size and mass constraints which trades off quality of user experience for quality of owner and operator experience. Passive hardware-based VR locomotion techniques translate various user motions into movement in the virtual environment, essentially incorporating the user as a virtual joystick, but tend to fall short in all of the key elements except potentially effort required to deploy and use.

What is needed is a method and system for omnidirectional wearable motion. Practitioners in the field have experimented with some wearable active hardware-based VR locomotion techniques in the past, but notably missing has been an implementation of omnidirectional motion. Omnidirectional motion in this context has two key elements: the ability for the user to walk in an arbitrary direction as compared to a hip or torso defined forward direction; and the ability for the user to place their feet on the ground in a range of angles with respect to their direction of travel, i.e. from in-toeing (or pigeon toe) to out-toeing (or duck-footed). Addressing both of these key elements is critical for a safe, quality user experience. The invention disclosed herein implements a means to address both forms of omnidirectional motion.

SUMMARY

One embodiment relates to a method for controlling a pair of robotic boots worn by a user in a virtual reality system. The method includes measuring a pose data of the user and the pair of robotic boots; determining if the user is outside of an exit area, and in response to determining that the user is outside of the exit area: calculating an intended velocity of the user; calculating a motion of the boots to counteract the intended velocity of the user; calculating the motion of the boots to move the user into the entry area; calculating a total desired motion of the pair of robotic boots; calculating a motion command in response to the measured pose data and the total desired motion; sending a boot motion command to the pair of robotic boots; calculating a drive module motion commands from boot motion commands and a drive module data; sending the drive module motion commands to a drive module; controlling a plurality of drive module motors in response to the drive module motion commands; and moving the user in virtual reality with the intended velocity.

Another embodiment relates to a robotic boot for wireless control in a virtual reality system. The robotic boot includes a power electronics module, a boot controller, a radio, and at least one tracker. The boot controller is in data communication with the power electronics module and the radio. The robotic boot has a front drive module and a rear drive module; a boot chassis and a battery. The boot controller controls velocity and position based on virtual reality tracking data to maintain the user inside a predetermined operating space while the user is wearing the robotic boot.

Another embodiment relates to a system for controlling movement of a user via a pair of robotic boots. The system includes a virtual reality system in data communication with a computing device and a pair of robotic boots. A base station is in data communication with the computing device and with the robotic boots and measures a pose data of the user and the pair of robotic boots. A processor determines if the user is outside of an exit area, and in response to the user being outside of the exit area: calculates an intended velocity of the user, a motion of the boots to counteract the intended velocity of the user, the motion of the boots to move the user into the entry area, a total desired motion of the pair of robotic boots; and a motion command in response to the measured pose data and the total desired motion. The processor sends a boot motion command to the pair of robotic boots; calculate a drive module motion commands from boot motion commands and a drive module data; send the drive module motion commands to a drive module; control a plurality of drive module motors in response to the drive module motion commands; and move the user in virtual reality with the intended velocity.

The invention disclosed herein provides both the advantages of the active hardware-based VR locomotion techniques by effectively converting the entire VR workspace into a virtual omnidirectional treadmill as well as the deployability advantage of a wearable design with a compact and versatile form factor.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which:

FIG. 8 is a hardware overview of the front and rear foot positioning mechanisms and of the size adjustment mechanisms.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
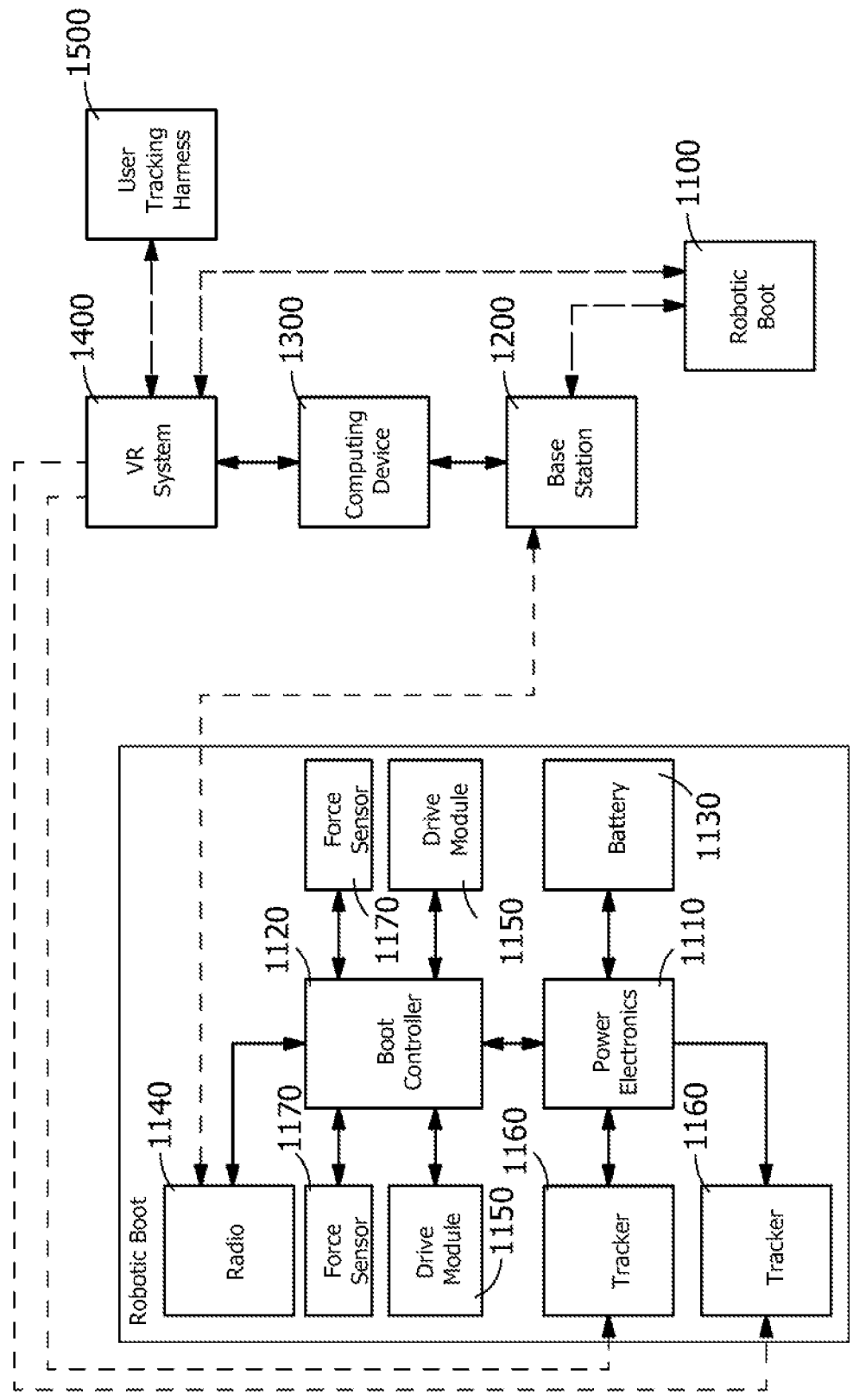
FIG. 1 is a high-level diagram of the system.

The virtual reality locomotion system described herein and illustrated in FIG. 1 enables users to experience walking through expansive Virtual Reality (VR) environments from within physically limited spaces such as 10 by 10 foot areas. The system is comprised of a plurality of Robotics Boots 1100, a Base Station 1200, a Computing Device 1300, a VR System 1400, and a User Tracking Harness 1500.

The Robotic Boots 1100 are worn by the user and communicate wirelessly with the Base Station 1200 and VR System 1400. The Robotics Boots are responsible for providing appropriate motion to enable physically constrained walking motions and reporting their pose for control purposes.

The Base Station 1200 communicates with the Robotics Boots 1110 and Computing Device 1300. The Base Station is responsible for receiving data from the Computing Device, calculating and communicating commands to the Robotic Boots, receiving feedback data from the Robotic Boots, and calculating and communicating VR motion commands to the Computing Device.

The Computing Device 1300 communicates with the Base Station 1200 and the VR System 1400. The Computing Device is responsible for providing user and operator interfaces, communicating tracking data to the Base Station, and interacting with the VR System to create VR motion.

The VR System 1400 includes the content as well the visual, audio, and pose tracking capabilities.

The User Tracking Harness 1500 communicates wirelessly with the VR System 1400 and provides user pose data to constrain their location to within the VR workspace.

From a systems and electronics perspective, the Robotic Boot 1100 is comprised of Power Electronics 1110, a Boot Controller 1120, a Battery 1130, a Radio 1140, a plurality of Drive Modules 1150, one or more Trackers 1160, and may include one or more Force Sensors 1170 as illustrated in FIG. 1.

The power electronics 1110 receives power from the battery 1130, controls the on/off state of the robotic boot from user inputs, and provides power to the boot controller 1120 and trackers 1160.

The boot controller 1120 interfaces with the Power Electronics 1110, Radio 1140, Drive Modules 1150, and Force Sensors 1170. The boot controller distributes power from the Power Electronics, transmitting and receiving data with the Radio, sending and receiving data from the Drive Modules, reading data from the Force Sensors, and calculating Boot local control commands for the Drive Modules. The Power Electronics 1110 or the boot controller 1120 may measure and evaluate the charge state of the battery, through indirect means such as voltage measurement, or direct means such as charge flow measurement.

The Battery 1130 is an appropriately specified rechargeable battery.

The Radio 1140 provides wireless communication with the Base Station and may operate in the 2.4 GHz spectrum, or other suitable wireless band.

The Drive Modules 1150 provide the motive means for the Robotic Boots.

The Trackers 1160 provide the pose of the Robotic Boot for data collection and control purposes. One or more may be directly affixed to the Robotic Boot while one or more may be directly affixed to the user's leg. In other embodiments, user pose data may be provided by other means such as boot or room-mounted sensors, or via the head-mounted display itself.

The Force Sensors 1170 may be used to detect if the Robotic Boot is worn, how the user's weight is distributed, and the user's ground reaction forces and torques.

Figure 2:
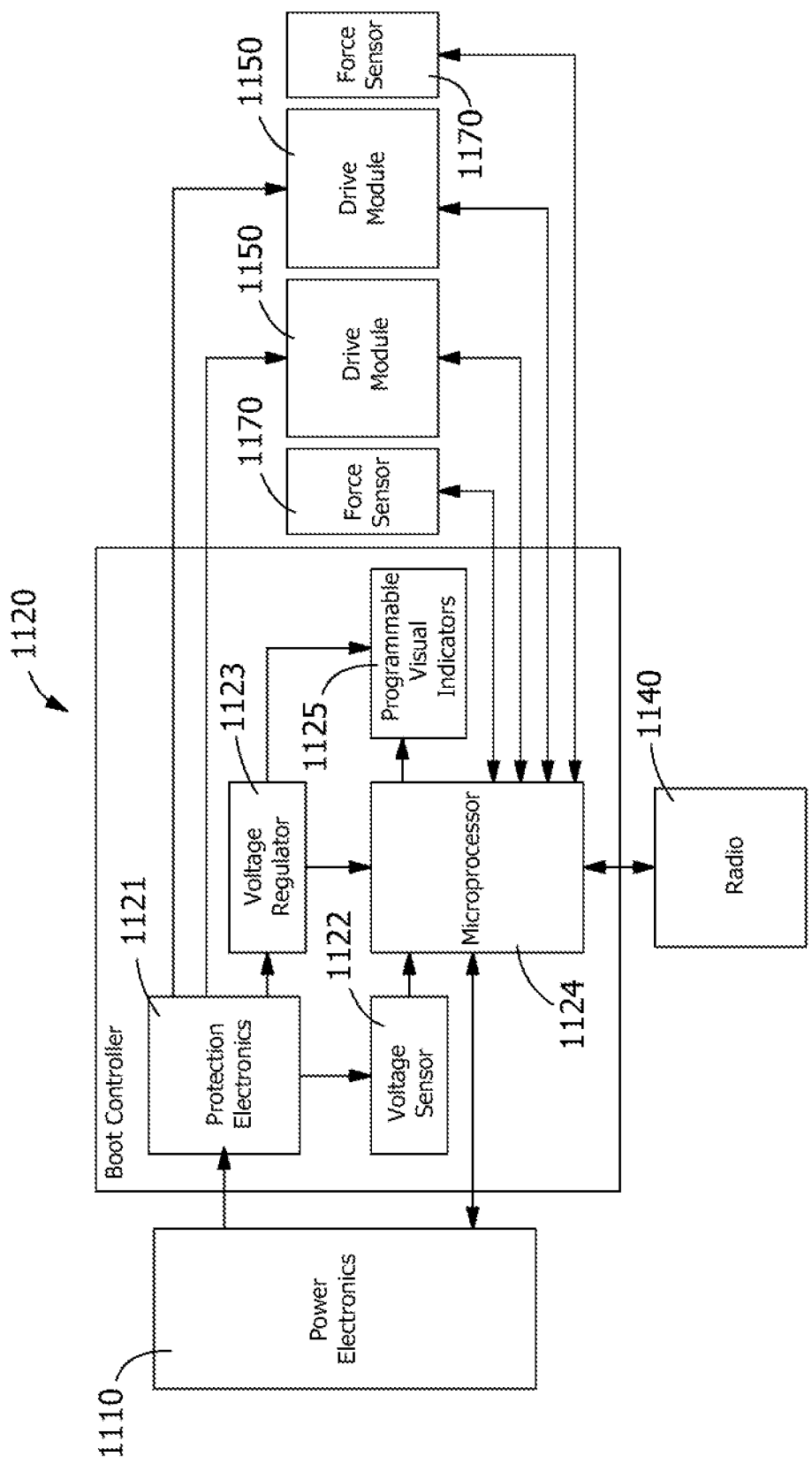
FIG. 2 is a diagram detailing the electrical layout of the boot controller.

Illustrated in FIG. 2, the boot controller 1120 is comprised of a set of Protection Electronics 1121 to protect against a variety of faults, a Voltage Sensor 1122 for measuring the voltage provided by the Power Electronics 1110, a Voltage Regulator 1123 for providing appropriate power to the Microprocessor and Programmable Visual Indicators, a Microprocessor 1124 for interfacing and computing, and programmable visual indicators 1125 to provide real time user and operator feedback.

Figure 3:
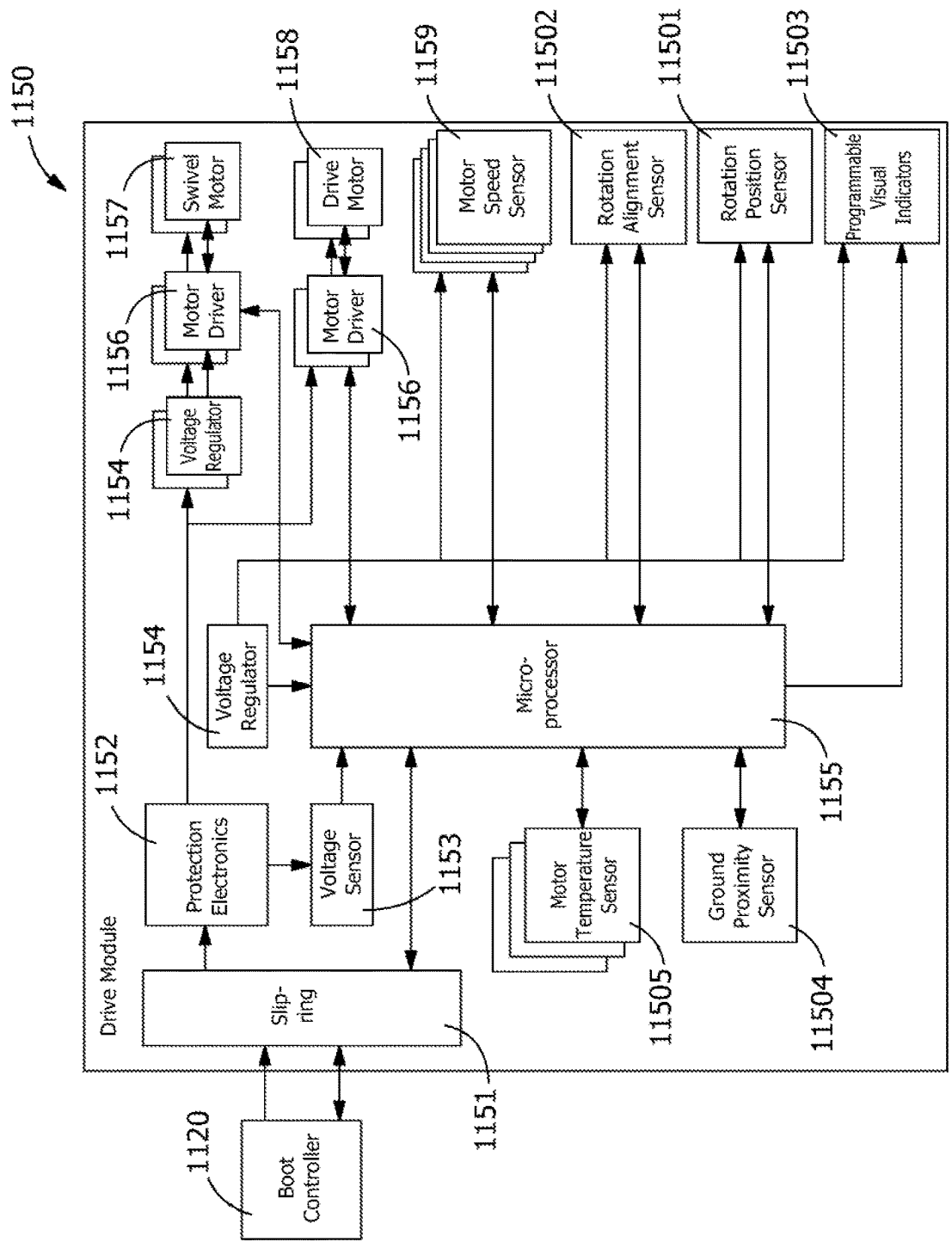
FIG. 3 is a diagram detailing the electrical layout of the drive module.

Illustrated in FIG. 3, from a systems and electronics perspective, the drive module 1150 is comprised of a microprocessor and a set of interfaces, power electronics, sensors, and motor electronics. The drive module 1150 interface to the boot controller 1120 is through a continuous rotation electromechanical spring 1151. The Protection Electronics 1152 protect against a variety of faults. The Voltage Sensor 1153 measures the voltage provided by the boot controller. Voltage Regulators 1154 provide appropriate power to the Microprocessor, sensors, and the swivel Motor Drivers 1156. The Microprocessor 1155 provides interfacing and computing capabilities. There are two sets of motors (Swivel Motors 1157 and Drive Motors 1158) and Motor Drivers 1156 for controlling planar and rotation motion. The Motor Speed Sensors 1159 are used to control the motors and can also provide position when needed. The Rotation Position Sensor 11501 detects the orientation of the Drive Module while the Rotation Alignment Sensor 11502 provides a calibration datum. The programmable visual indicators 11503 provide real time user and operator feedback. The Ground Proximity Sensor 11504 determines the location of the Drive Module with respect to the ground. The Motor Temperature Sensors 11505 provide health and safety monitoring of motor performance.

Figure 4:
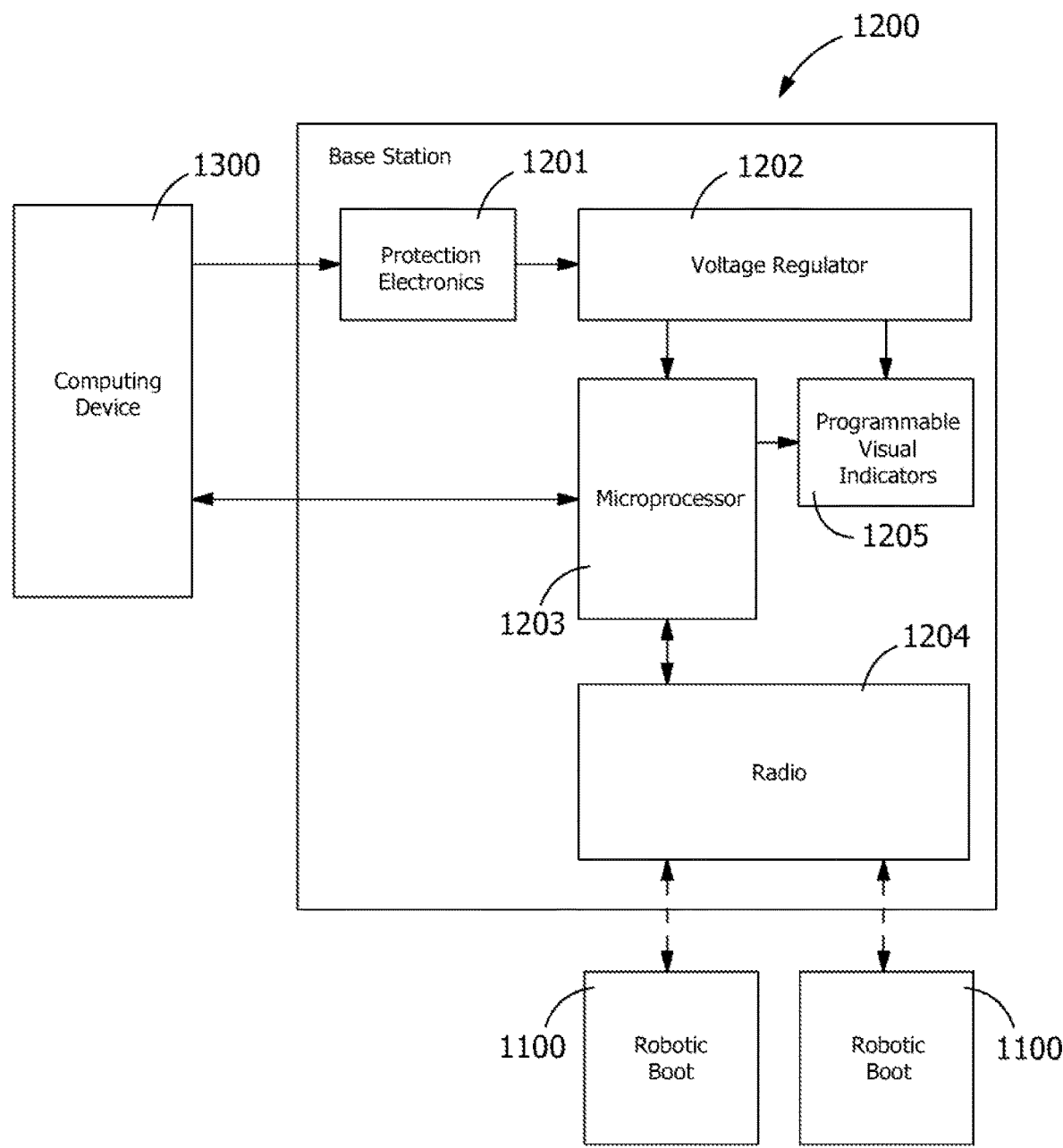
FIG. 4 is a diagram detailing the electrical layout of the base station.

Illustrated in FIG. 4, the Base Station 1200 is comprised of a set of Protection Electronics 1201 to protect against a variety of faults, a Voltage Regulator 1202 for providing appropriate power to the Microprocessor and Programmable Visual Indicators, a Microprocessor 1203 for interfacing and computing, a Radio 1204 for communicating with the Robotics Boots, and programmable visual indicators 1205 to provide real time user and operator feedback.

An omnidirectional robotic boot 1100 is described below and illustrated in the associated drawings. Unless otherwise specified, the robotic boot 1100 and/or its various components may, but are not required to, contain at least one of the structures, components, functionalities, and/or variations described, illustrated, and/or incorporated herein.

Figure 5:
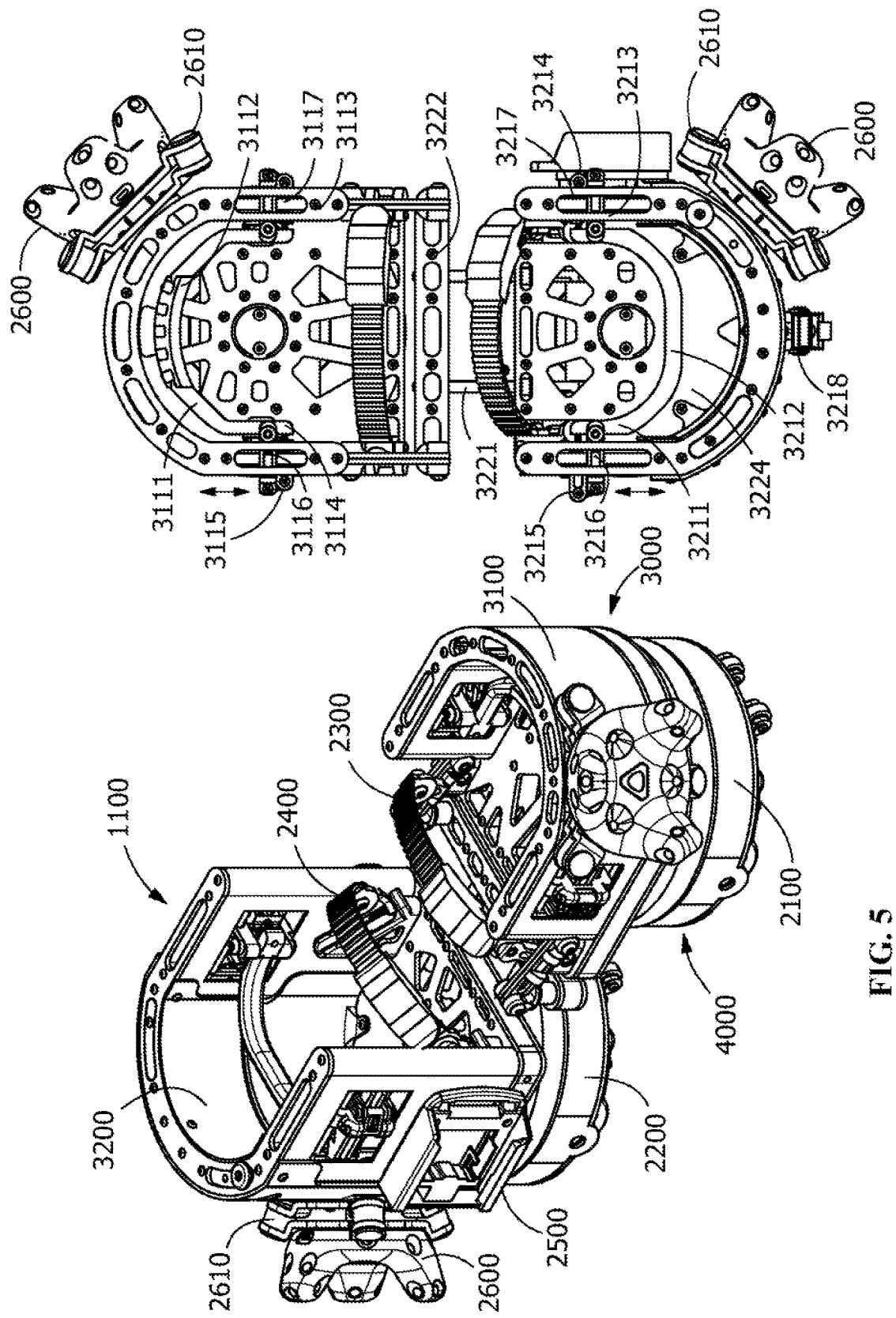
FIG. 5 is a hardware overview of the robotic boot.

Referring now to the drawings where like reference numerals identify corresponding or similar elements throughout the several views, FIG. 5 is a schematic representation of an omnidirectional robotic boot 1100 with automatic motorized control in accordance with one embodiment of the invention.

Each robotic boot 1100 has a front drive module subassembly 2100 and a rear drive module subassembly 2200. Each robotic boot 1100 has a front part strap 2300 and rear part strap 2400 that secure the user to the robotic boot 1100 over the top of the user's shoes. The robotic boot 1100 comprises a boot chassis 3000 subassembly, a battery 1130, a plurality of trackers 2600, and a plurality of drive module subsystems 4000. The boot chassis 3000 is divided into a front part 3100 and a rear part 3200.

A robotic boot 1100 and components and functionalities in conjunction thereof are shown in FIG. 5. As shown in FIG. 5, robotic boot 1100 may include a boot chassis 3000 having drive module subassemblies 4000 below the chassis 3000 portion. Boot chassis 3000 portion may be configured to contain and support a user's shoe. Boot chassis 3000 portion may be configured to receive a left or a right shoe of the user. The drive module subassemblies 4000 are coupled to the chassis front part 3100 and chassis rear part 3200 via a series of screws or other appropriate fasteners. Drive module subassemblies 4000 may or may not be able to be removed from the boot chassis 3000. Drive module subassemblies 4000 may be attached to the boot chassis 3000 via alternative attachment methods including but not limited to magnets, clamping mechanisms, spring-loaded locking mechanisms, etc.

This invention relates to a chassis-type boot 3000, and more particularly to a size-adjustable boot of the kind comprising a chassis and a fastening system. It is an object of this invention to provide a rigid boot chassis 3000 that is adjustable in length and can thus be precisely fitted to varied sizes and shapes of shoes, while allowing natural shoe flexion. Boot chassis 3000 may be comprised of a rigid structure or may be comprised of a soft material or fabric structure. Boot chassis 3000 may be size adjustable or may be created at specific standardized sizes. Boot chassis 3000 may or may not allow natural shoe flexion. The invention may relate to a chassis-type boot 3000 or a non-chassis-type boot that only includes adjustment or user attachment or fastening mechanisms. The invention may relate to a standard boot or shoe that can accommodate the attachment or affixing of drive module subassemblies 4000.

Figure 6:
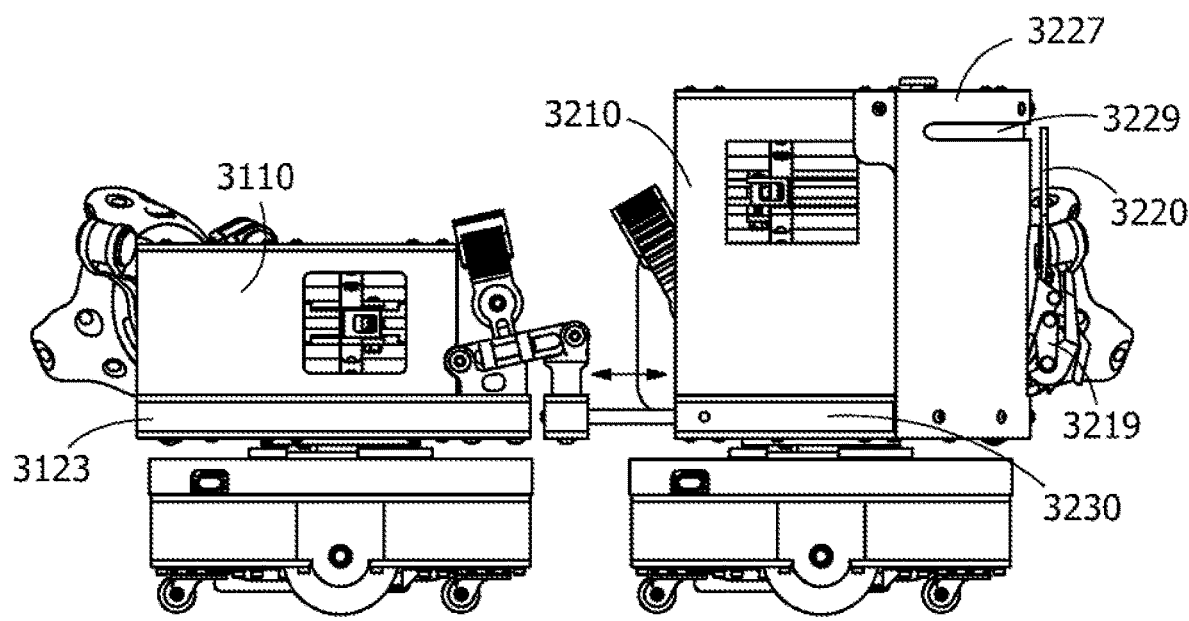
FIG. 6 details the chassis of the robotic boot.

As illustrated in FIG. 6, the front part 3100 of the boot includes upper 3110 and lower 3123 front portions, while the rear part 3200 of the boot includes upper 3210 and lower 3230 rear portions. Illustrated in FIG. 8, robotic boot includes a front portion positioning system 3111, rear portion positioning system 3211, and size adjustable mechanism 3211 for adjusting a length of the chassis 3000 base to be suitable for a user's shoe, which is provided at predetermined incremental positions of the chassis 3000 base and a retraction mechanism to maintain the size of the chassis 3000 at a user's shoe size. The boot chassis 3000 may include a size adjustable mechanism 3211 that has a continuous adjustable range opposed to predetermined incremental positions so as to adjust a length of the chassis 3000 base to be suitable for a variety of user shoes and sizes. The boot chassis 3000 may also include battery 1130 and battery attachment structure 2500. The battery 1130 and battery attachment structure 2500 may be attached to the rear upper portion 3210 or the front upper portion 3110. The battery 1130 may or may not exist within or be attached to the drive module subassemblies 4000. The battery 1130 may or may not be able to be removed from the boot chassis 3000 or the drive module subassemblies 4000. The battery attachment structure 2500 may or may not have additional degrees of freedom including but not limited to an articulated hinge, sliding mechanism, parallel bar linkage, etc. The battery attachment structure 2500 may or may not have additional locking mechanisms including but not limited to spring-loaded locking mechanisms, magnets, etc.

The front lower portion 3123 and the rear lower portion 3230 includes mounting points at which a strap may be placed, holding the user's shoe in place, enabling the user to pick up the boot with their shoe, while preventing the shoe from being removed from the boot.

The front upper portion 3110 is coupled to the lower front portion 3123 via a series of screws or other appropriate fastener. Similarly, the rear upper portion 3210 is coupled to the lower rear portion 3230 via the screws.

Figure 7:
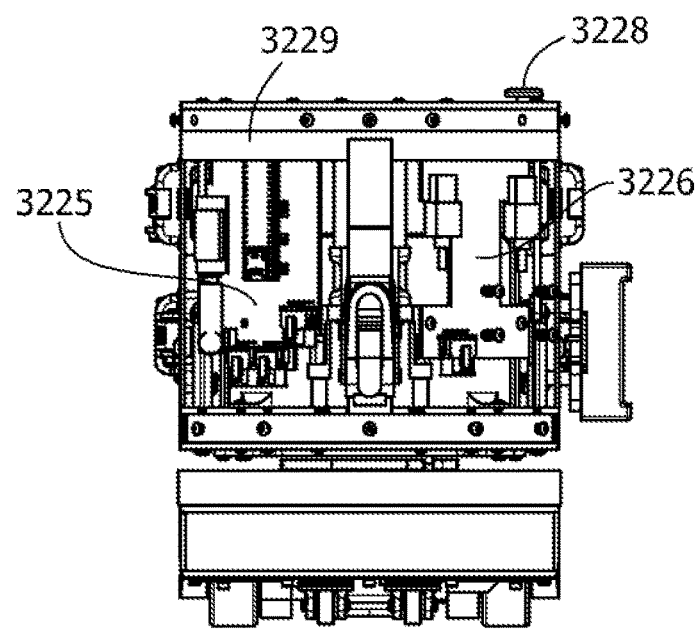
FIG. 7 details the hardware aspects of the boot controller and power electronics.

The front upper portion 3110 may include a tracker 2600 mounting and damper system 2610, the front portion positioning system 3111, and the boot flexion mechanism 3118. Represented in FIG. 6, FIG. 7, and FIG. 8, the rear upper portion 3210 also includes a tracker 2600 mounting and damper system 2610, the rear portion positioning system 3211 and the size adjustable mechanism 3218, as well as additional components such as control 3225 and power 3226 electronics, and their respective enclosure 3227. Represented in FIG. 7, electronics may include a power switch 3228 and programmable visual indicators 3229.

Figure 9:
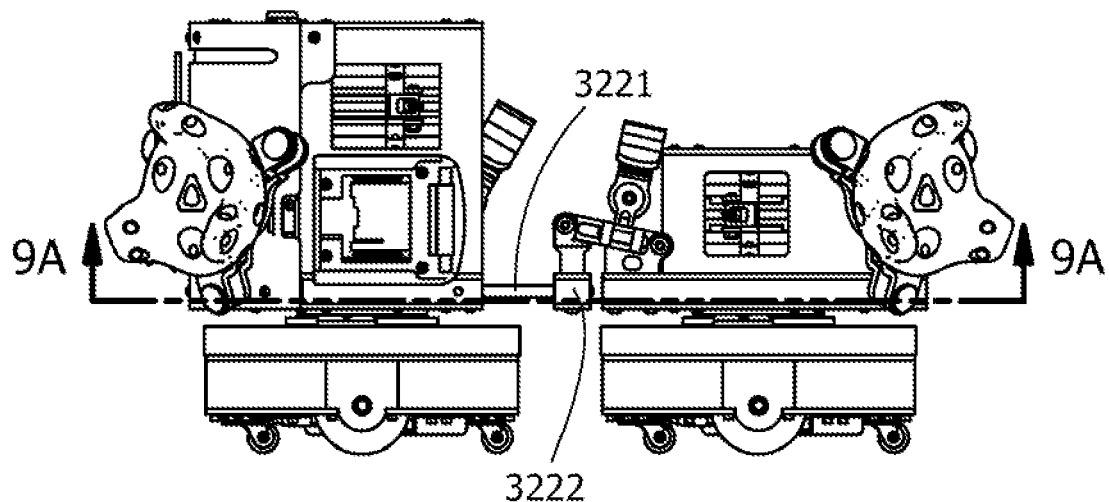
FIG. 9 details the size adjustment mechanisms.
Figure 9A:
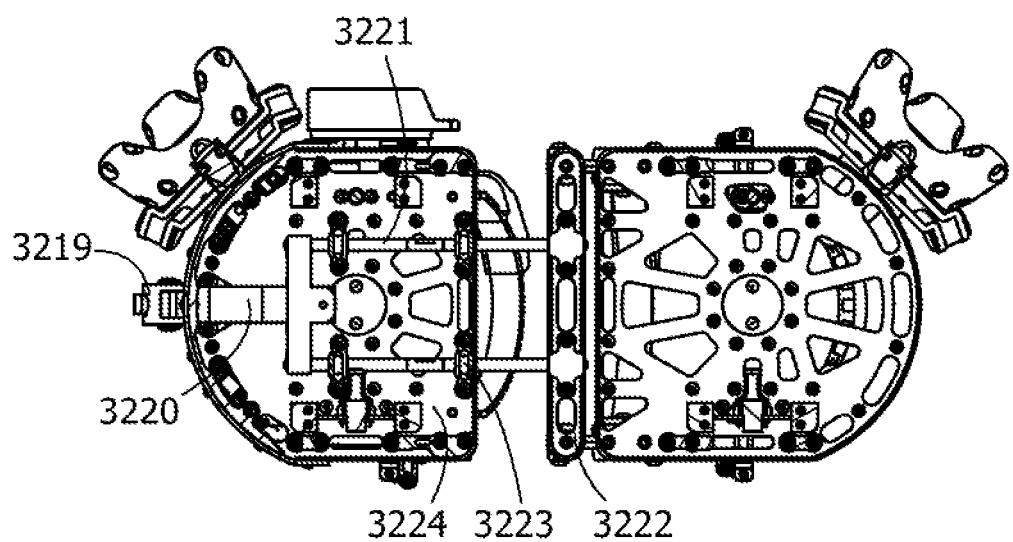
FIG. 9A details a top isometric view of the extended size adjustment mechanism.

Illustrated in FIG. 9 and FIG. 9A, the size adjustable mechanism 3218 includes a strap ratcheting buckle 3219 rigidly attached to the rear upper portion 3211 of the boot chassis 3000. The ratcheting buckle 3219 is connected to a ratchet ladder strap 3220 attached to a plurality of rods 3221 which are fixated to the adjustable section of the rear lower portion 3222 and run through a plurality of bearings 3223 which are fixated to the non-adjustable section of the rear lower portion 3224. Manipulation of the exit/release lever on the ratcheting buckle 3219 allows the connected ratchet ladder strap 3220 the freedom to move within its limits set by the bearings 3223 and structures within the rear lower portion 3230 of the boot chassis 3000. The ratchet ladder strap 3220 is attached to and moves in unison with the adjustable section of the rear lower portion 3222 which increases the distance between the front part 3100 and the non-adjustable section of the lower rear portion 3224. Conversely, manipulation of the crank/ratchet lever on the ratcheting buckle 3219 engages with the indentations on the ratchet ladder strap 3220 and causes it to move within its limits set by the bearings 3223 and structures within the rear lower portion 3230 of the boot chassis 3000 in the opposite direction. The ratchet ladder strap 3220 in this scenario moves in unison with the adjustable section of the rear lower portion 3222 which decreases the distance between the front part 3100 and the non-adjustable section of the rear portion 3224. The size adjustable mechanism may or may not include additional mechanisms including but not limited to ratcheting dials, electronic buttons or other input components, etc.

Illustrated in FIG. 8, the front portion positioning system 3111 includes the front portion shoe ring 3112, dual ratchet rails 3113, dual ratchet teeth 3114, and dual sliders 3115, with one ratchet rail, spring-loaded ratchet tooth, and slider on each left and right side of the front portion shoe ring 3112. Pulling on the front portion shoe ring 3112 towards the rear of the boot chassis 3000 causes the spring-loaded ratchet teeth 3114 on each side of the front portion shoe ring 3112 to depress against the features of the ratchet rails 3113, allowing the front portion shoe ring 3112 to move towards the rear of the boot chassis 3000 until the spring-loaded ratchet teeth 3114 lock into the next set of ratchet teeth cavities in the ratchet rails 3113 or until it reaches the end of the ratchet rails 3113. The ratchet teeth cavities in the ratchet rails 3113 prevent the front portion shoe ring 3112 from moving towards the front of the boot chassis 3000 unless the sliders 3115 are manually pressed which releases the spring-loaded ratchet teeth 3114 from the ratchet rails 3113. The position and quantity of the ratchet teeth cavities in the ratchet rails 3113 are predetermined and set at specific size increments. When the ratchet teeth 3114 are not in contact with the ratchet rail 3113 cavities, the front portion shoe ring 3112 slides smoothly along linear bearings 3116 and rods 3117 that are a part of the front upper portion 3110. The front portion shoe ring 3112 may include a plurality of spring-loaded ratchet teeth 3114. The spring-loaded ratchet teeth 3114 may be orientated and actuated either horizontally or vertically. The spring-loaded ratchet teeth 3114 may or may not contact the features of the ratchet rails 3113.

Similarly, represented in FIG. 8, the rear portion positioning system 3211 includes the rear portion shoe ring 3212, dual ratchet rails 3213, dual ratchet teeth 3214, and dual sliders 3215, with one ratchet rail, ratchet tooth, and slider on each left and right side of the rear portion shoe ring 3212. Pushing on the rear portion shoe ring 3212 towards the front of the boot chassis 3000 causes the ratchet tooth 3214 on each side of the rear portion shoe ring 3212 to depress against the features of the ratchet rail 3213, allowing the rear portion shoe ring 3212 to move towards the front of the boot chassis 3000 until the ratchet teeth 3214 lock into the next set of ratchet teeth cavities in the ratchet rails 3213 or until it reaches the end of the ratchet rails 3213. The ratchet teeth cavities in the ratchet rails 3213 prevent the rear portion shoe ring 3212 from moving towards the rear of the boot chassis 3000 unless the sliders 3215 are manually pressed which releases the ratchet teeth 3214 from the ratchet rails 3213. The position and quantity of the ratchet teeth cavities in the ratchet rails 3213 are predetermined and set at specific size increments. When the ratchet teeth 3214 are not in contact with the ratchet rail cavities, the rear portion shoe ring 3212 slides smoothly along linear bearings 3216 and rods 3217 that are a part of the rear upper portion 3210. The rear portion shoe ring 3212 may include a plurality of spring-loaded ratchet teeth 3214. The spring-loaded ratchet teeth 3214 may be orientated and actuated either horizontally or vertically. The spring-loaded ratchet teeth 3214 may or may not contact the features of the ratchet rails 3213.

Figure 10:
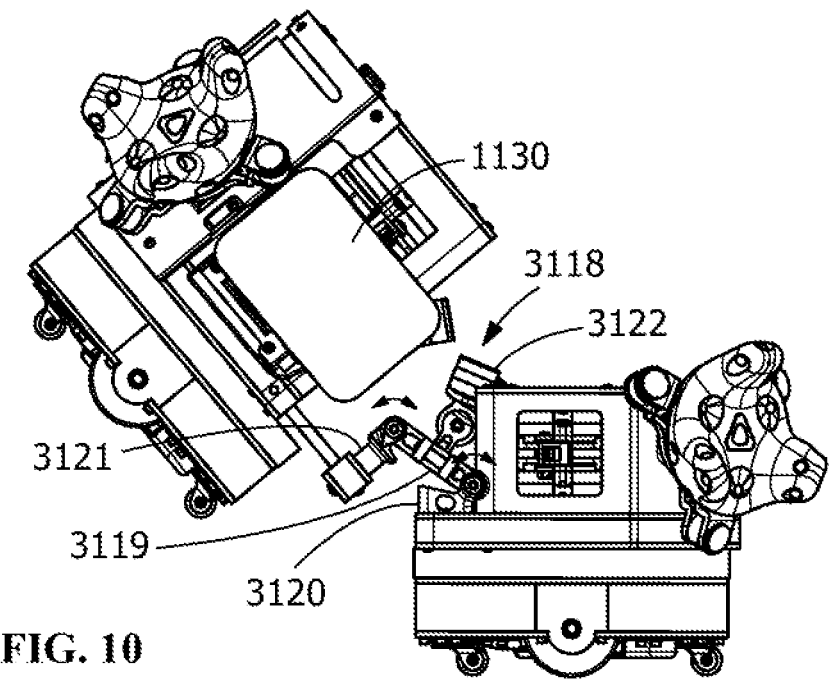
FIG. 10 details the robotic boot flexion mechanisms.
Figure 11:
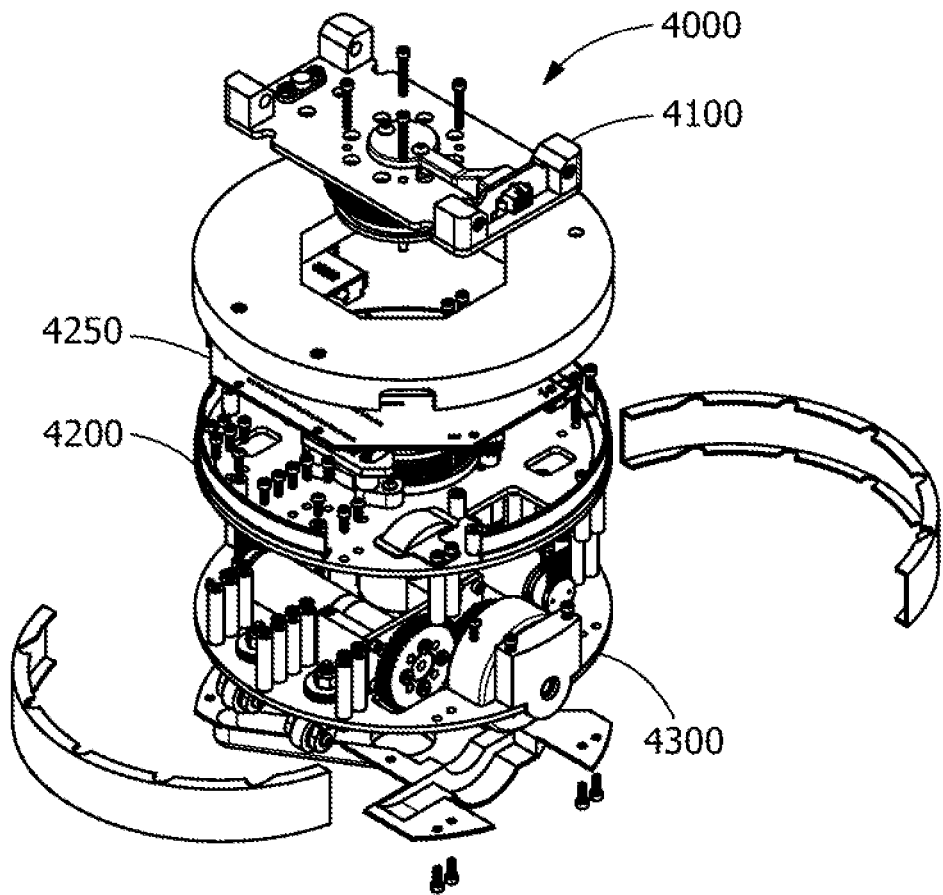
FIG. 11 is an isometric exploded view of the drive module.

Illustrated in FIG. 10, the boot flexion mechanism 3118 includes a bridge center beam 3119, a front portion hinge 3120, and a rear portion hinge 3121. The dual pivot between the front portion hinge 3120 and the rear portion hinge 3121 allows the user to flex the shoe and boot chassis 3000 up to a predetermined and set angle. The center beam 3119 bridging the front portion hinge 3120 and rear portion hinge 3121 includes the front portion strap 3122 so that the fastening system is not counterproductive to a natural shoe flex. Both the front portion hinge 3120 and the rear portion hinge 3121 have features that limit the lowest angle that is achievable by the dual pivot design, as to limit the front lower portion 3123 and rear lower portion 3230 to never be able to move past the point at which the two are parallel.

Chassis alternative embodiments could include a unibody design, an articulated sandal-like portion, variations in length changing mechanisms (such as leadscrew, linkages, and rack and pinion), removal or integration of trackers 2600, removable adjustment portions or elimination thereof, a sliding mechanism for the flex portion 3118, elimination of interface structures, reduction of hinge points, flexibility of adjustable heel portion, motorized and/or automated adjustments, relocation or integration of electronics 3225 and 3226, changes to number/location/type of restraining straps, relocation of the battery 1130 from the boot to the user, and number and location of drive modules 4000. Further alternative embodiments could include variations in positioning systems such as lead screws, linkages, etc., removal or integration of battery 1130 or additional power sources, addition or subtraction of adjustment mechanisms, relocation of battery 1130 or additional power sources, integration of interface structures and positioning systems, and relocation of trackers 2600.

A robotic boot 1100 according to the present invention includes a plurality of drive module subassemblies 1150, providing the directed motive means of the robotic boot. Each drive module subassembly thereafter referred to as Drive Module 4000 as illustrated in FIG. 11, FIG. 12, FIG. 13, and FIG. 14 is comprised of a Top Portion 4100, a Middle Portion 4200, and Bottom Portion 4300. When a robotic boot is assembled, the Top Portion of the Drive Module is affixed to the bottom of either the front portion or rear portion of the boot chassis 3000 via screws or other acceptable fastening means and connected electronically via acceptable cabling.

Figure 12:
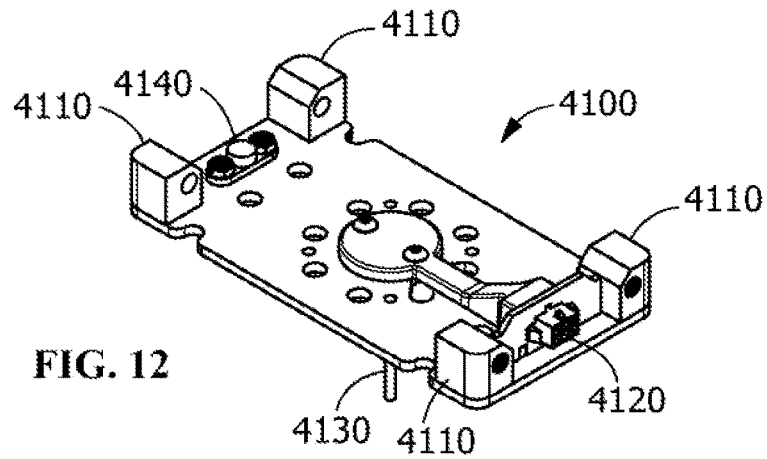
FIG. 12 details the top portion of the drive module.

The Top Portion 4100 of the Drive Module 4000 illustrated in FIG. 12 provides a plurality of mounting points 4110 for attachment to the boot chassis 3000 and the electrical connection 4120 to the boot chassis 3000, attachment points and fasteners for the middle portion of the drive module, and may include a portion of the sensing system for determining the rotation of the drive module 4130 and a rotation datum 4140.

Figure 13:
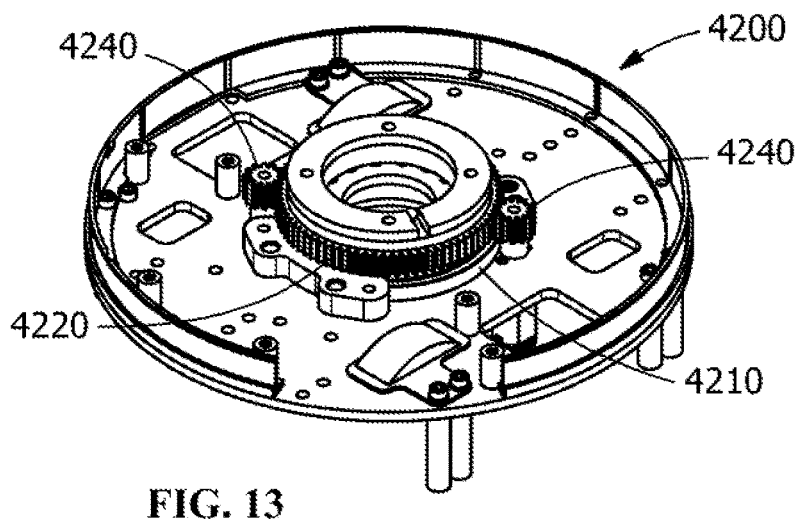
FIG. 13 details a top isometric view of the middle portion of the drive module.
Figure 13A:
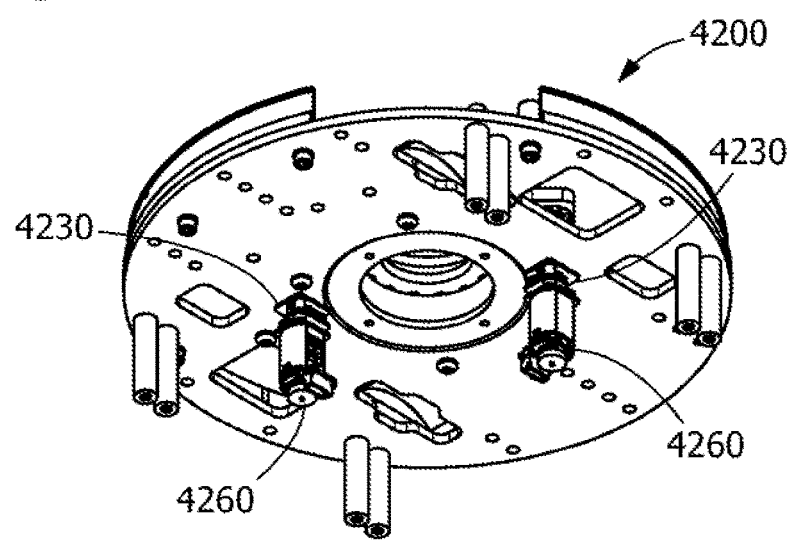
FIG. 13A details a bottom isometric view of the middle portion of the drive module.

The Middle Portion 4200 of the Drive Module 4000 illustrated in FIG. 13 and FIG. 13A is comprised of a means of rotational motion, motive means of rotational motion when the drive module is not in contact with the ground, a plurality of mounting points for attachment to the top and bottom portions of the drive module, and the main drive module electronics 4250. In this present embodiment, the means of rotational motion 4210 may be a bearing such as a crossed-roller bearing. Likewise, the motive means of rotational motion may be comprised of a central gear 4220 stationary with respect to the top portion of the drive module and the inner race of the bearing and a plurality of motors 4230 with secondary gears 4240 that are stationary with respect to the outer race of the bearing and the bottom portion of the drive module. The rotational motors may be powered and controlled by the Drive Module Electronics 4250 and may include sensing means 4260 for determining rotational position and/or velocity. The electronics may include the other portion of the sensing system for determining the rotation datum of the drive module.

Figure 14:
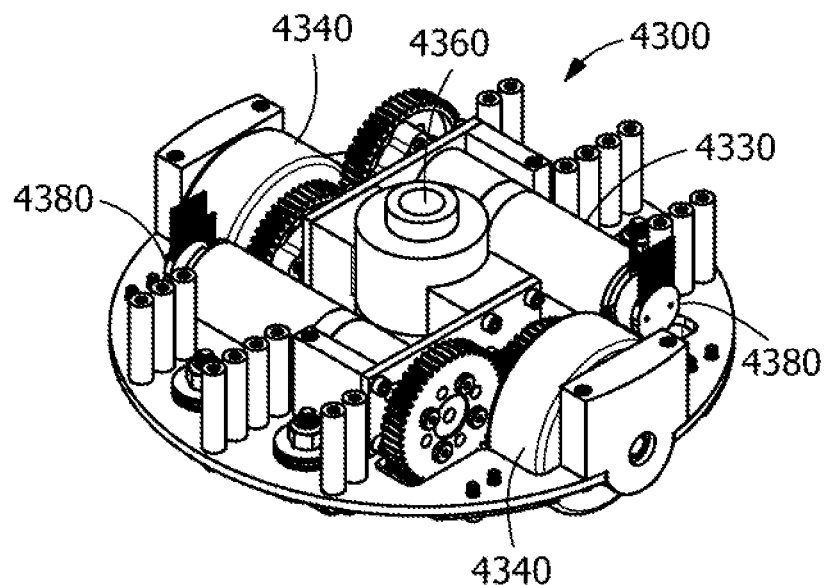
FIG. 14 details a top isometric view of the bottom portion of the drive module.
Figure 15:
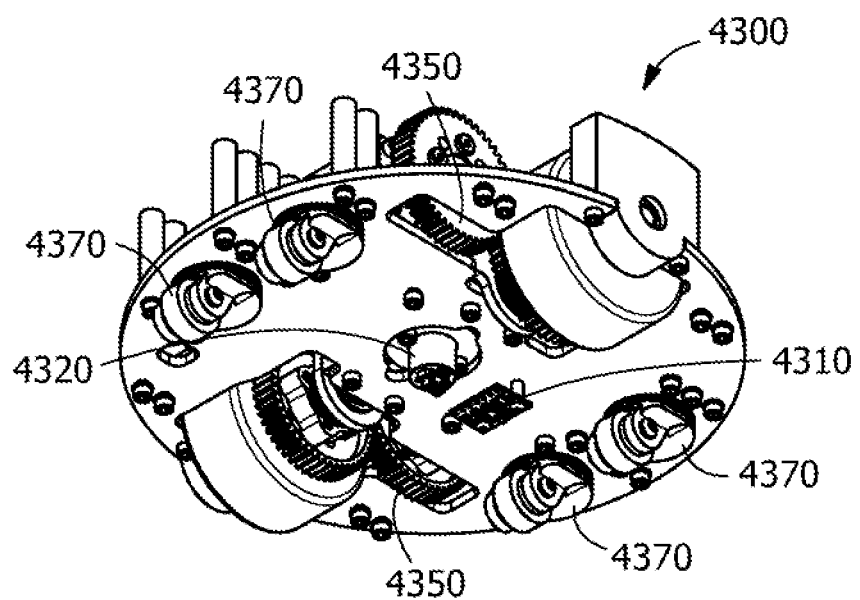
FIG. 15 details a bottom isometric view of the bottom portion of the drive module.

The Bottom Portion 4300 of the Drive Module 4000 illustrated in FIG. 14 and FIG. 15 is comprised of motive means for translation and rotation when the drive module is in contact with the ground, electromechanical means of conveying power and signals to the top portion without rotational limitation, and ground contact means of distributing loading forces. It may include sensing means for detecting ground proximity or contact 4310 and a portion of the sensing means for determining the rotation of the drive module 4320. In this present embodiment, the motive means for translation and rotation when the drive module is in contact with the ground may be comprised of a plurality of motors 4330 driving a plurality of wheels 4340 through a plurality of mechanical transmission systems such as gears 4350. The electromechanical means of conveying power and signals without rotational limitation may consist of an electromechanical spring 4360 affixed to the bottom portion with wiring to the top and middle portions. The ground contact means of distributing loading forces may be comprised of a plurality of wheels or rollers 4370 that are free to rotate along the wheel or roller axis as well along the orthogonal axis. The motors may be powered and controlled by the Drive Module Electronics 4250 and may include sensing means for determining rotational position and/or velocity 4380.

Alternative designs of the Drive Module 4000 could include a mechanism that allows the drive motors to change the orientation of the Drive Module while in the air by means of a physical disc contacting affixed rollers that is disengaged when the Drive Module is contacting the ground. The overall Drive Module design could potentially be replaced by a suitable array of omnidirectional wheels, such as an x or plus configuration with associated independent motors. Similarly, the Drive Module could be replaced by a single wheel with a drive and swivel motor with independent, joint, or coaxial operation. The plurality of motors 4230 with secondary gears 4240 and sensing means 4260 may be replaced by one or more brushless gimbal motors that provide motive means to central gear 4220 via an idler or similar transmission method. Furthermore, all of these elements and the means of rotational motion 4210 may be replaced by a central, direct drive brushless gimbal motor.

The motive means consisting of a plurality of motors 4330 and a plurality of mechanical transmission systems 4350 may be replaced by direct drive brushless motors. Similarly, the motor drivers 1156 may be located on a central circuit board within drive module 4000 or may be on separate communicating or non-communicating circuit boards or may be incorporated into electronics mounted on motors 4330 or any equivalency of motors 4230.

The plurality of wheels or rollers 4370 may be replaced with an uncastered design that rotates on a parallel axis to the plurality of wheels 4340 with appropriate lead-in and lead-out to ensure compatibility with the motive means of rotation. The structure elements indicated within the Top Portion 4100, Middle Portion 4200, and Bottom Portion 4300 may be combined and redesigned per common manufacturing design practices for processes such as injection molding or various forms of machining.

In addition to the pose sensing capabilities of the plurality of Trackers 1160, additional orientation, velocity, and acceleration sensing means may be incorporated into the Boot Chassis 3000 and Drive Module 4000. Similarly, load sensing means like Force Sensor 1170 may also be included within the Drive Module 4000.

Figure 22:
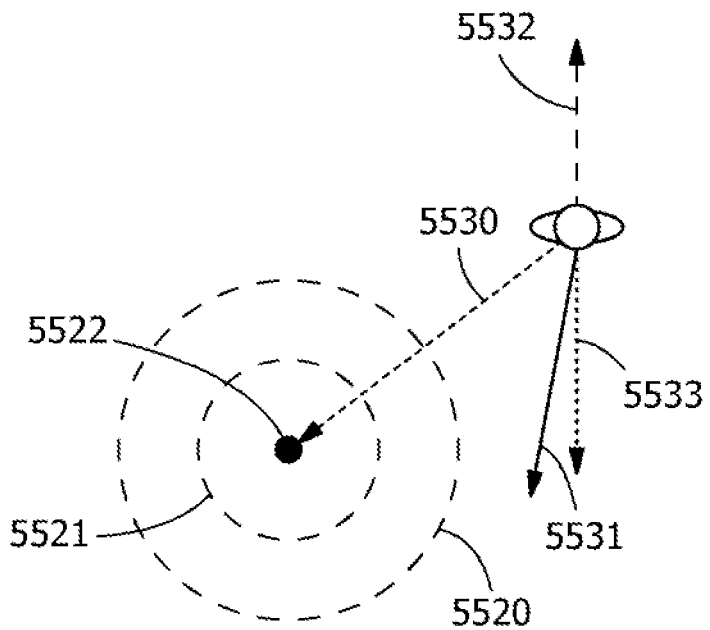
FIG. 22 is a diagram that details additional information of how the base station calculates the command to the boots.
Figure 26:
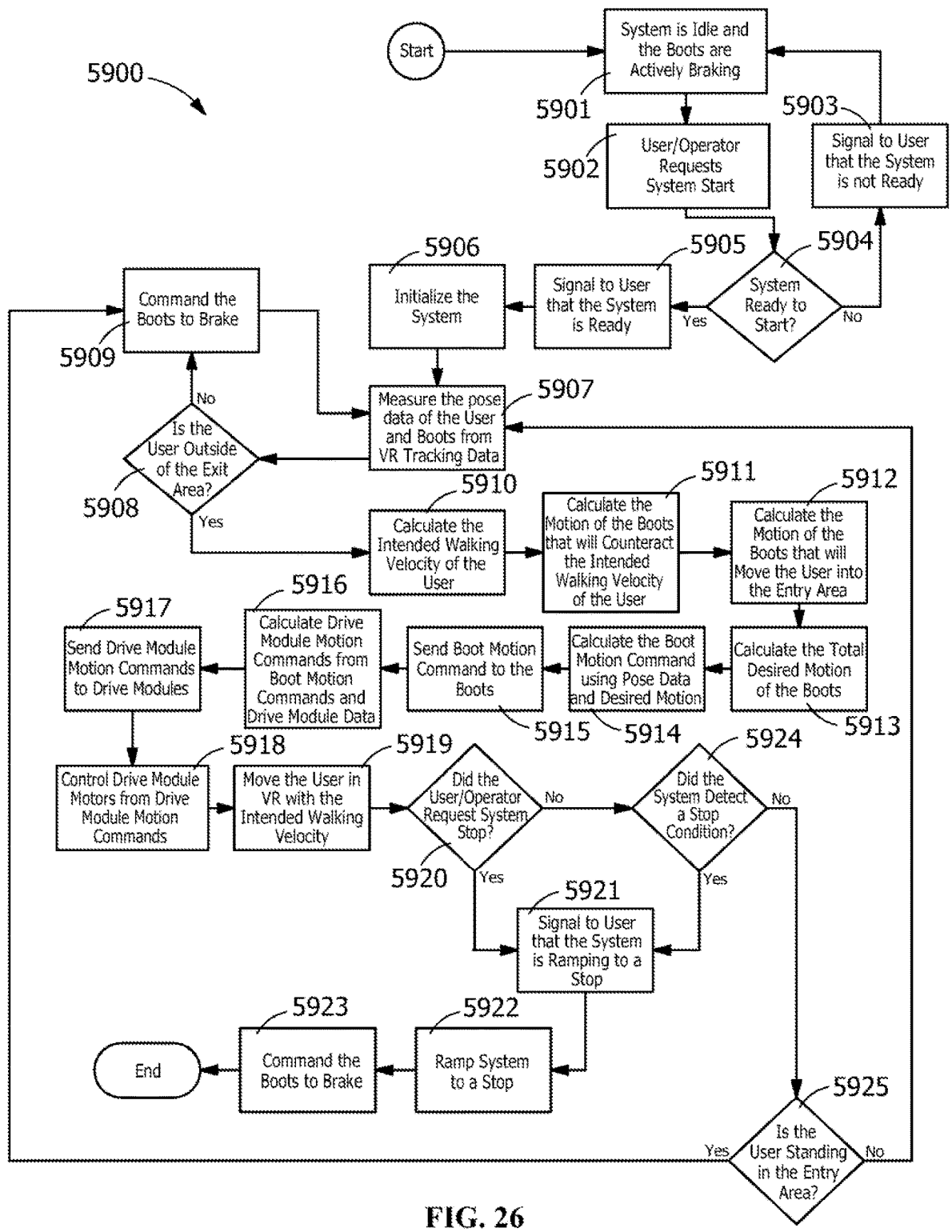
FIG. 26 is a flowchart that details the execution of the entire system.

Flowchart 5900 in FIG. 26 describes the operation of the entire system. When the system turns on it will go to step 5901 where the system is inactive, and the robotic boots 1100 are set to active brake, resisting sliding and twisting motion of the foot from the user. When a user or operator requests the system to start in step 5902, either by the user pressing the start button on a controller as part of the VR system 1400, or by the operator pressing the start button on the GUI 5300, the server 5011 will then check if the system is ready to start in step 5904. If the system is not ready to start, it will move to step 5903, and use visual and auditory cues to signal to the user and operator that the system is not ready to start. If the system is ready, then it will move to step 5905 and signal to the user that the system is starting with visual and auditory cues. The system is then initialized in step 5906. In the next step 5907, the system measures pose data of the user and boots 1100 from VR tracking data obtained from the VR system 5002 using trackers 1160. The system then uses the pose data to check if the user is outside of the exit zone 5520 in FIG. 22 in step 5908. If the user is not outside the exit zone 5520, then the system will command the boots 1100 to active brake, and go to step 5907. If the user is outside the exit area 5520, the system then moves to step 5910. In step 5910, the system calculates the intended walking velocity of the user as shown in FIG. 22 as 5532. In step 5911, the system uses the intended walking velocity 5532 to calculate a boot motion 5533 in FIG. 22 that will counteract the intended walking velocity 5532. In step 5912, the system uses the position of the user to calculate a boot motion 5530 in FIG. 22 that will move the user into the entry area 5521. In step 5913, the system uses the boot motions 5532 and 5530 calculated in previous steps 5911 and 5912 to calculate the total desired motion of the boots, which is shown in FIG. 22 as 5531. Then in step 5914, the system calculates the boot motion command using the pose data from step 5907 and the total desired motion from step 5913. In step 5915, the boot motion command is sent to the robotic boots 1100. In step 5916, the boot controller 1120 calculates drive module motion commands from the boot motion command and data from the drive modules 1150. The boot controller 1120 sends the drive module motion commands to the drive modules 1150 in step 5917. The drive modules 1150 control the motors 1157 and 1158 in the drive module according to the drive module motion commands calculated in step 5918. In step 5919, the system moves the user in VR with their intended walking velocity 5532 calculated in step 5910. In step 5920, the system checks if the user or operator has requested the system to stop. If there was a stop request, the system signals to the user and operator that the system is ramping to a stop in step 5921. The system then ramps to a stop in step 5922. Then the system commands the boots 1100 to actively brake in step 5923, and then the system is brought to an idle state. If the user and operator did not request a system stop, then the system checks for other stop conditions in step 5924. If there was a stop condition detected, the system moves to step 5921. If no stop conditions are detected, the system moves to step 5925 and checks with the pose data from step 5907 if the user is standing in the entry area 5521. If the user is standing in the entry area 5521, the system moves back to step 5909. If the user is not standing in the entry area 5521, the system moves back to step 5907.

Figure 16:
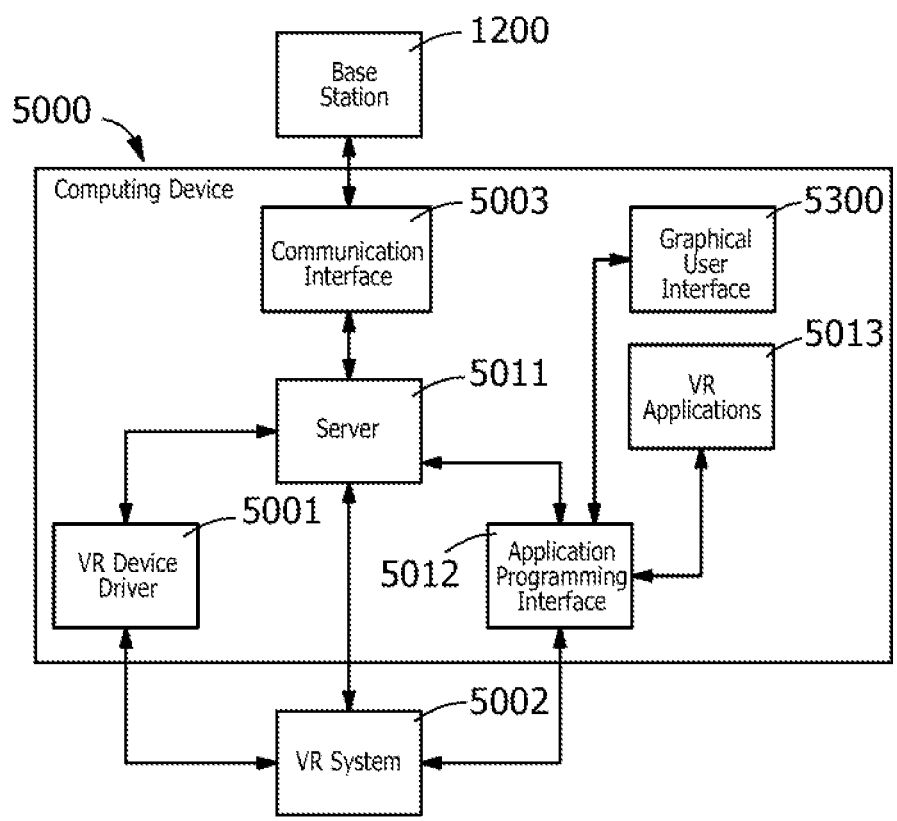
FIG. 16 details the software layout of the computing device.

FIG. 16 describes the layout of the computing device 5000. The Server 5011 communicates with the Base Station 1200, the VR device driver 5001, and the VR system 5002. Server 5011 also exposes an Application Programming Interface (API) 5012 that allows the VR system 5002, and other VR applications 5013 to communicate with the system. The API 5012 also allows for a Graphical User Interface (GUI) 5300, that allows the user to interact with the system. The API also allows for other clients to interact with the system as needed. The server 5011 is also referred to as the System Management App in FIG. 18.

Figure 17:
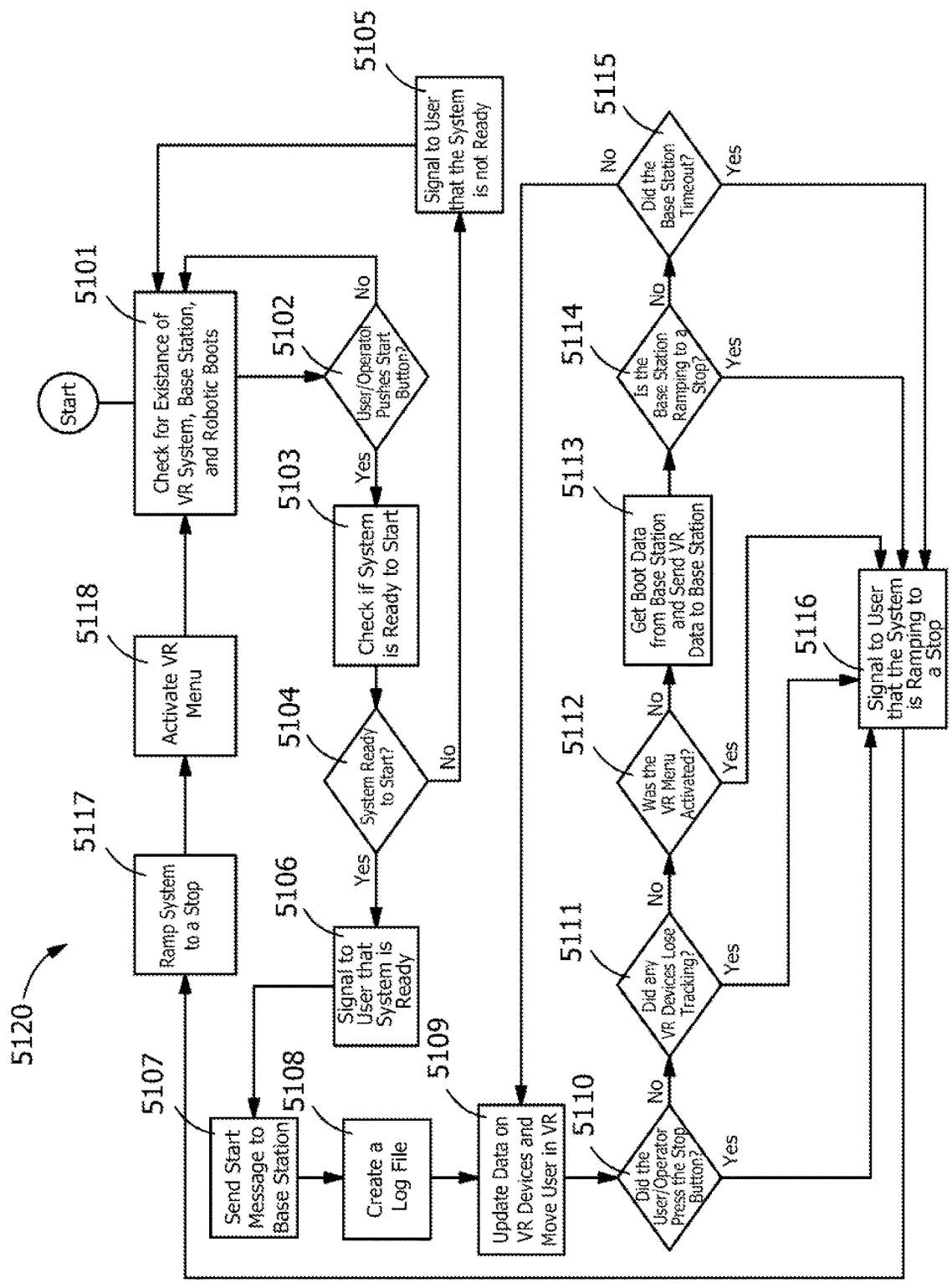
FIG. 17 is a flowchart that details the execution of the system management application.

Flowchart 5120 in FIG. 17 describes the operation of the server 5011 that allows the user to start and stop the system and collects VR Tracking Data to send to the Base Station 1200 over the communication interface 5003. While the server 5011 is idle, it will check the existence of the VR system 5002, the Base Station 1200, and the Robotic boot controller 1120 in step 5101. When the user starts the system by pushing the start button on a controller as part of the VR system 1400 as checked in step 5102, the server 5011 will first go through a set of safety checks in step 5103. If the condition in step 5104 is met, the server 5011 will signal to the user that the system has started in step 5106 with audio and visual cues. If the condition in step 5104 is not met, then the server 5011 will signal to the user in step 5105 that the system has failed the safety checks, and the system will not start, and the server 5011 returns to step 5101. When the system starts running, the server 5011 goes through steps 5107 and 5108, and then goes to step 5109. When the server 5011 is in step 5109, it will collect VR tracking data from trackers 1160 and move the user in VR using data from step 113, and then check the VR tracking data for any reason to stop the system in steps 5110, 5111, and 5112. If there are any reasons to stop the system, then the server 5011 will signal to the user that it is ramping the system to a stop in step 5116, and then ramp the system to a stop in step 5117. When the system has ramped to a stop, the server 5011 will activate the VR Menu in step 5118, and then return to idle in step 5101. If there is no reason to stop the system, then the server 5011 will collect data from the base station 1200 and send VR Tracking Data to the base station 1200 in step 5113. If there are any reasons to stop the system from the base station data, as checked in steps 5114 and 5115, the server 5011 will execute steps 5116, 5117, and 5118 as above. If there are no reasons to stop the system, the server 5011 will return to step 5109.

Figure 18:
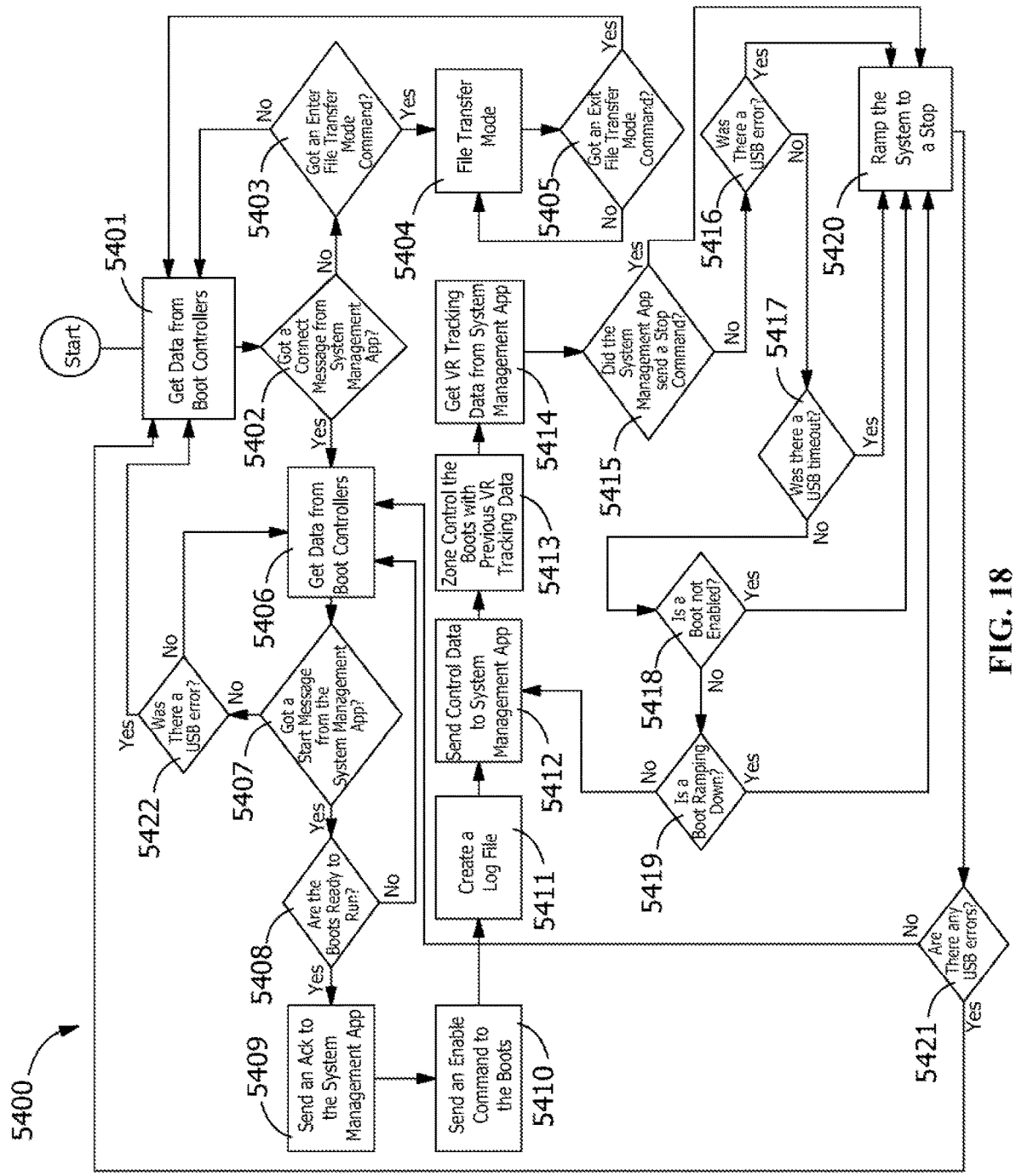
FIG. 18 is a flowchart that details the execution of the base station.

Flowchart 5400 in FIG. 18 describes the operation of the Base Station 1200 that uses VR tracking data to control the motion of the robotic boots 1100. When the base station 1200 is plugged into the computing device 5000 through a USB port, it waits for a connection to be made from the server 5011, which is checked in step 5402. While it is waiting for the server 5011 to make a connection, it will also gather data from the boot controllers 1120 in step 5401. In addition, while the base station 1200 has not made a connection to the server 5011, it can also be commanded over USB to enter/exit a file transfer mode to transfer log files off of the base station 1200 to the computing device 5000 through steps 5403, 5404, and 5405. After the base station 1200 has made a connection to the server 5011 in step 5402, it will wait for a start command from the server 5011 in an idle state. It will also send data from the boot controllers 1120 to the server 5011 in step 5406. If the condition in step 5407 is not met, then the base station 1200 will go to step 5422. If the condition in step 5422 is met, then the base station 1200 will disconnect from the server 5011 and return to step 5401. If the condition in step 5422 is not met, then the base station 1200 will return to step 5406. If the condition in step 5407 is met, then base station 1200 will communicate with the boot controllers 1120 in step 5408 to see if the robotic boots 1100 are ready to run. If the condition in step 5408 is not met, the base station 1200 will return to step 5406. If the condition in step 5408 is met, then the base station 1200 will send an acknowledgement message to the server 5011 in step 5409. Then in step 5410, the base station 1200 will send an enable command to the boot controllers 1120, and then create a logging file in step 5411. After this step, the system is enabled and running. After the system has started, the base station 1200 will first send VR control data to the server 5011 that will control how the user will move in VR in step 5412. Then it will command the boots 1100 to move according to the flowchart 5501 in FIG. 19 in step 5413 using VR tracking data from a previous iteration of the loop. The base station 1200 will then get VR tracking data from the server 5011 in step 5414. After VR tracking data is obtained, the base station 1200 will check if it needs to ramp the system down to a stop if the following conditions are met; if a server 5011 stop command is detected at step 5415, if a USB error is detected at step 5416, if a USB timeout signal is detected at step 5417, if a boot 1100 is not enabled at step 5418, and if a boot 1100 is ramping down at step 5419. If none of the conditions in the previous steps are met, the base station 1200 returns to step 5412. If any of the conditions in steps 5415, 5416, 5417, 5418, and 5419 are met, the base station 1200 will ramp the system to a stop in step 5420. After the base station 1200 ramps the system down to a stop, it will go back to the idle state in step 5406, unless the condition in step 5421 is met, in which case the base station will wait for another connection to be made, and return to step 5401. Another embodiment of the operation of Base Station 1200 includes a mode and method to reprogram the device with new firmware acquired from either the computing device 1300 it is connected to using the server 5011, or by a technician.

Figure 19:
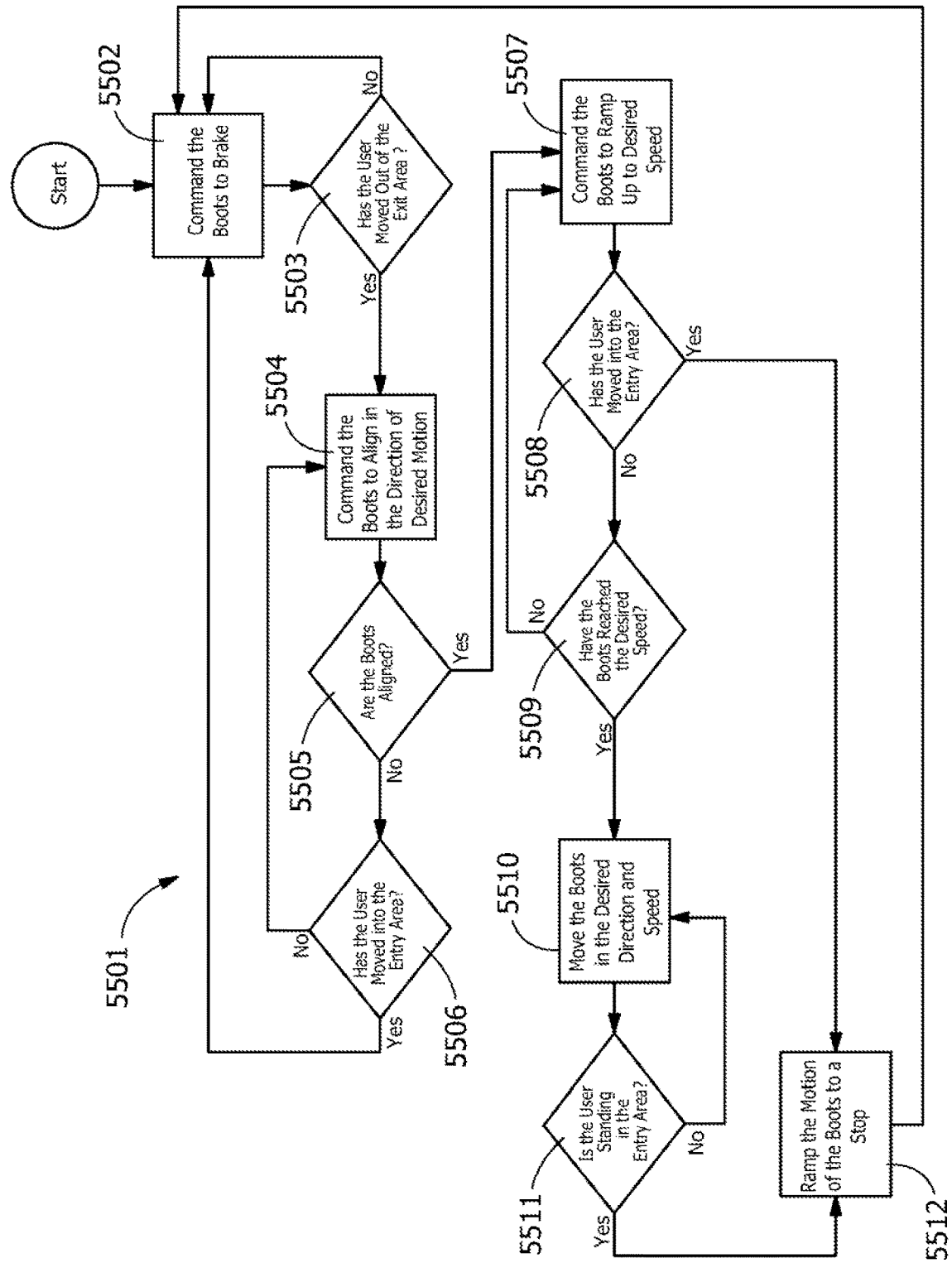
FIG. 19 is a flowchart that details the execution of the boot control by the base station.

Flowchart 5501 in FIG. 19 describes the operation how the base station 1200 uses VR tracking data to control the motion of the robotic boots 1100 to keep the user inside the operating space. At first, when the user is inside the exit area, which is 5520 in FIG. 22, the base station 1200 will command the boots 1100 to brake in step 5502. After the user moves out of the exit area 5520, which is checked in step 5503, the base station 1200 will command the robotic boots 1100 to align in the desired direction of motion in step 5504. If the user moves back into the entry area 5521 in FIG. 22, as checked by the condition in step 5506, the base station 1200 will command the robotic boots 1100 to brake. If both of the drive modules 1150 on both robotic boots 1100 are aligned in the desired direction of motion, as checked by the condition in step 5505, then the base station 1200 will command the robotic boots 1100 to ramp up to the desired velocity with a specific maximum acceleration in step 5507. Once the base station 1200 starts commanding the robotic boots 1100 to move with a desired velocity, if the user is standing inside the entry area 5521 in FIG. 22, as checked by step 5508, the base station 1200 will command the robotic boots 1100 to ramp to a stop in step 5512, and then return to commanding the robotic boots 1100 to brake in step 5502. Once the robotic boots 1100 are at the desired velocity, as checked by the condition in step 5509, the base station 1200 will continue to command the robotic boots 1100 to move in the desired direction and at the desired velocity in step 5510. If the user moves into the entry area 5521 in FIG. 22, as checked by step 5511, the base station 1200 will command the robotic boots 1100 to ramp to a stop in step 5512, and then return to commanding the robotic boots 1100 to brake in step 5502.

One mode of operation of the base station 1200 calculates the desired velocity and uses the position of the user to drive them to the center of the entry area 5521. The position of the user will determine which direction the desired velocity will be in, which is directly towards the center of 5521. The magnitude of the desired velocity is calculated using a specific profile that uses the distance of the user to the center of 5521. FIG. 22 shows a top down view of how the base station 1200 moves the user based on their position. 5520 is the exit area, 5521 is the entry area, and 5522 is the center of the space that is the target point that the base station 1200 is moving the user towards. FIG. 22 shows a top down view of how the base station 1200 modifies the desired direction 5530 that is commanded to the boots 1100 based upon the direction that the user is facing 5532. Once the base station 1200 calculates the desired direction of motion 5530 from the direction that the user is facing 5532, the base station 1200 will then modify that direction 5530 to be closer to the opposite direction that the user is facing. Arrow 5531 shows the resulting modified direction of motion.

Figures 20, 21:
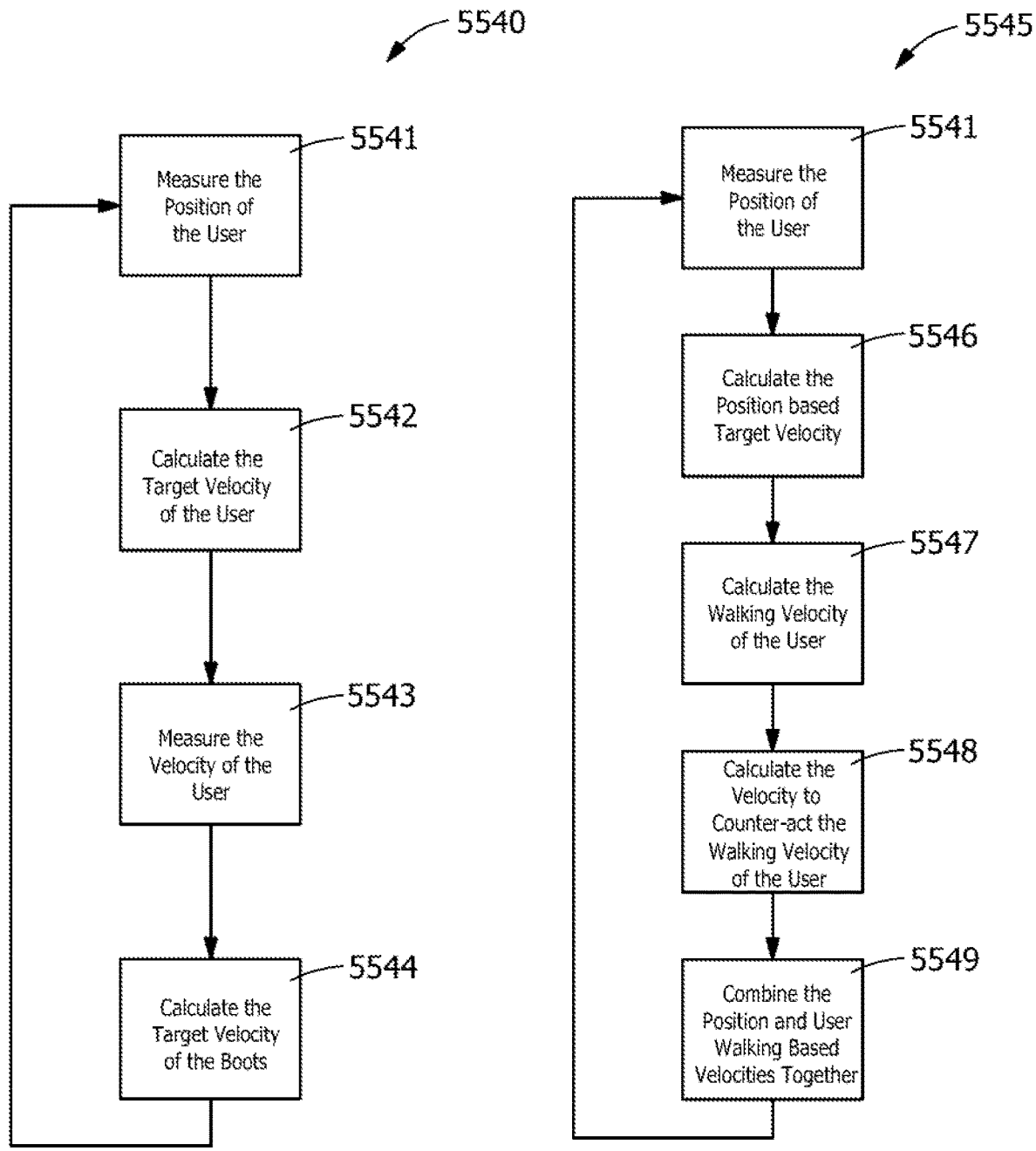
FIG. 20 is a flowchart that details the execution of calculations by the base station for boot control commands.
FIG. 21 is a flowchart that details an alternate embodiment of calculations by the base station for boot control commands.

In addition to the position-based speed control method, another method of moving the user uses the velocity of the user in addition to the position of the user. The user velocity controller uses a cascaded PID control loop to control the motion of the user. The first control loop uses the distance of the user from the walking in place area to calculate a desired velocity relative to the operating space. The second control loop uses the desired velocity to calculate the desired velocity of the boots 1100 from the measured velocity of the user relative to the direction that the user is facing. Flowchart 5540 in FIG. 20 shows the steps taken by the user velocity controller. First the position of the user is measured from VR tracking data in step 5541. Then from the position of the user, the target velocity of the user is calculated in step 5542. Then the velocity of the user is measured from VR tracking data in step 5543. From the measured velocity of the user, the target velocity of the robotic boots 1100 is calculated in step 5544.

Another mode of operation of how the base station 1200 calculates the desired velocity 5531, uses both the position and calculated intended walking velocity of the user. Flowchart 5545 in FIG. 21 shows the steps taken by the user velocity controller. First the position of the user is measured from VR tracking data in step 5541. Then from the position of the user, the position-based velocity 5530 is calculated in step 5546 to move the user back into entry area 5521. Then the intended walking velocity 5532 of the user is calculated from VR tracking data in step 5547. The intended walking velocity of the user 5532 may be calculated from using a mathematical model based on the physics of the system, or a machine learning model that uses historical and current data to predict and model the intended walking velocity of the user 5532. From the calculated walking velocity of the user, a user walking-based velocity 5533 that will counteract the walking velocity of the user 5532 is calculated in step 5548. The position-based velocity 5530 and user walking-based velocity 5533 are combined in step 5549 to calculate the total target velocity of the robotic boots 1100 as shown as element 5531.

A user intent system may use machine learning algorithms to predict and/or classify the motion of the user given current and past data. The data that would be used in the machine learning algorithms may include force sensors on the robotic boots and VR tracking data. The machine learning algorithms may use this data to generate models to predict and/or classify the motion of the user. This output of the model may be used by the base station 1200 to move the robotic boots as an augmentation or replacement of the methods described above.

Figure 23:
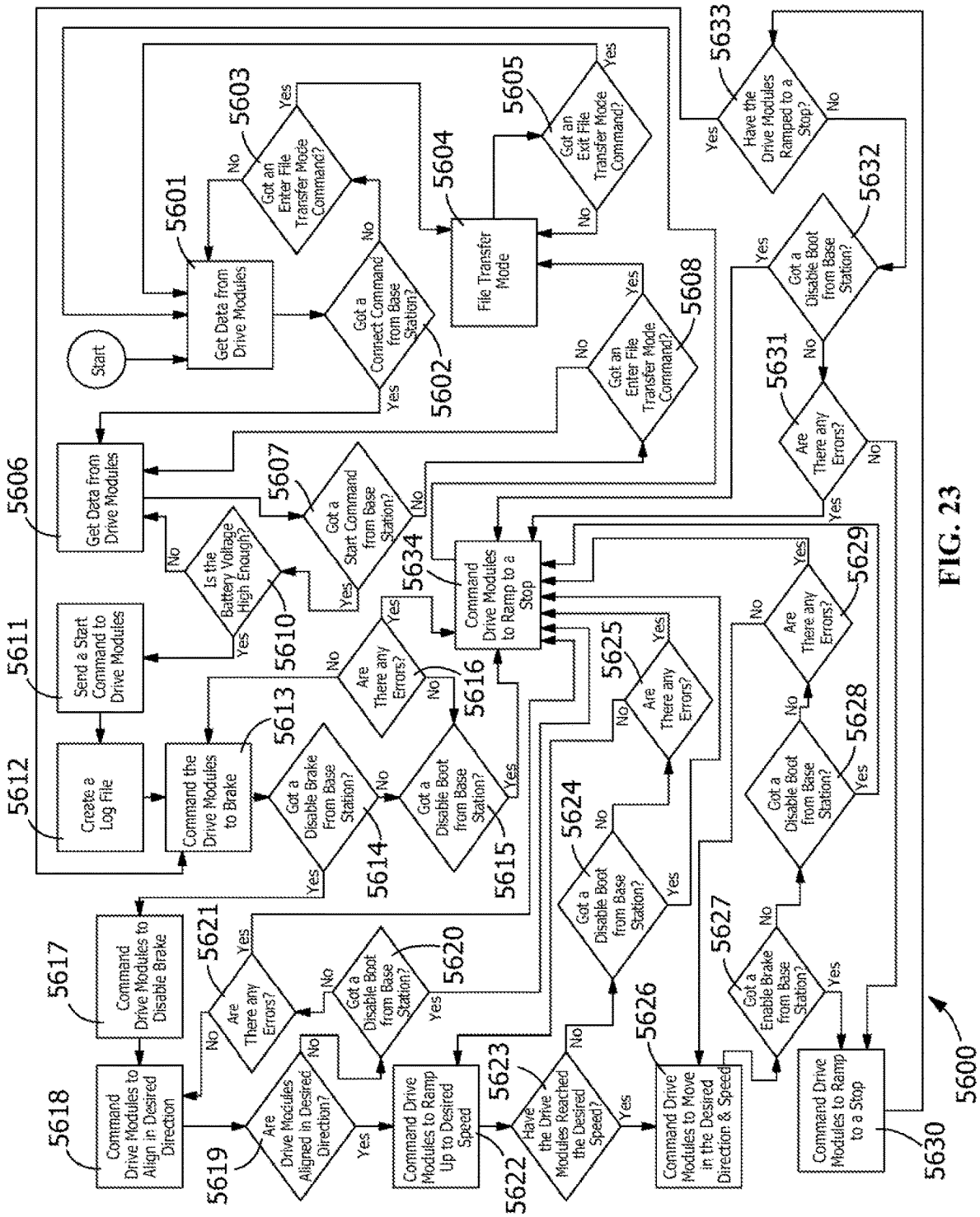
FIG. 23 is a flowchart that details the execution of a boot controller.

Flowchart 5600 in FIG. 23 describes the operation of the boot controller 1120 that commands the drive modules 1150 to move depending on commands that are received over radio 1140. When the boot controller 1120 is first turned on, it will command the drive modules 1150 to send telemetry data over serial in step 5601, while waiting for the base station 1200 to send a connect command as checked in step 5602. In addition, the boot controller 1120 will send calibration data to the drive modules 1150 as part of step 5601. While the boot controller 1120 is waiting for a connection to the base station 1200, it can be commanded over USB from computing device 1300 to enter a file transfer mode to transfer log files off of the boot controller 1120 to the computing device 1300 following the steps 5603, 5604, 5605, and 5608. After the boot controller 1120 has received a connect command from the base station 1200, it will continue to obtain data from the drive modules 1150 in step 5606 while waiting for a start command from the base station 1200 as checked in step 5607. While waiting for a start command, the boot controller 1120 can still be commanded to enter the file transfer mode from step 5608. After the boot controller 1120 has received a start command, it will first check that the battery voltage is high enough to safely operate the boot 1100 in step 5610. If the battery voltage is not high enough, the boot controller 1120 will not start, and return to step 5606. If the battery voltage is high enough, then the boot controller will send start commands to the drive modules and create a log file in steps 5611 and 5612. While the boot controller 1120 is running, if it receives a disable boot command from the base station 1200 as checked in steps 5615, 5620, 5624, 5628, and 5632, or if it detects any errors as checked in steps 5616, 5621, 5625, 5629, and 5631, the boot controller 1120 will command the drive modules 1150 to ramp to a stop in step 5634, and then go back to waiting for a connect command from the base station 1200 in step 5601. At first, when the boot controller 1120 starts running, it will command the drive modules 1150 to brake in step 5613, waiting for a command from the base station 1200. If the boot controller 1120 receives a disable brake command as checked in step 5614, the boot controller 1120 first commands both drive modules 1150 to align in the desired direction from the commands from the base station 1200 in steps 5618 and 5619. After both modules 1150 have aligned, the boot controller 1200 will command them to ramp up to the desired speed from the commands from the base station 1200 in steps 5622 and 5623. After the drive modules 1150 have ramped up to the desired speed, the boot controller 1120 will continue to command the drive modules 1120 in the commanded direction and speed obtained from the commands from the base station 1200 in step 5626. When the boot controller 1120 is commanding the drive modules 1150 to move, if an enable brake command is received from the base station 1200 as checked in 5627, the boot controller will command the drive modules 1150 to ramp to a stop in step 5630, and then returns to step 5613 to command the drive modules 1150 to brake.

Figure 24:
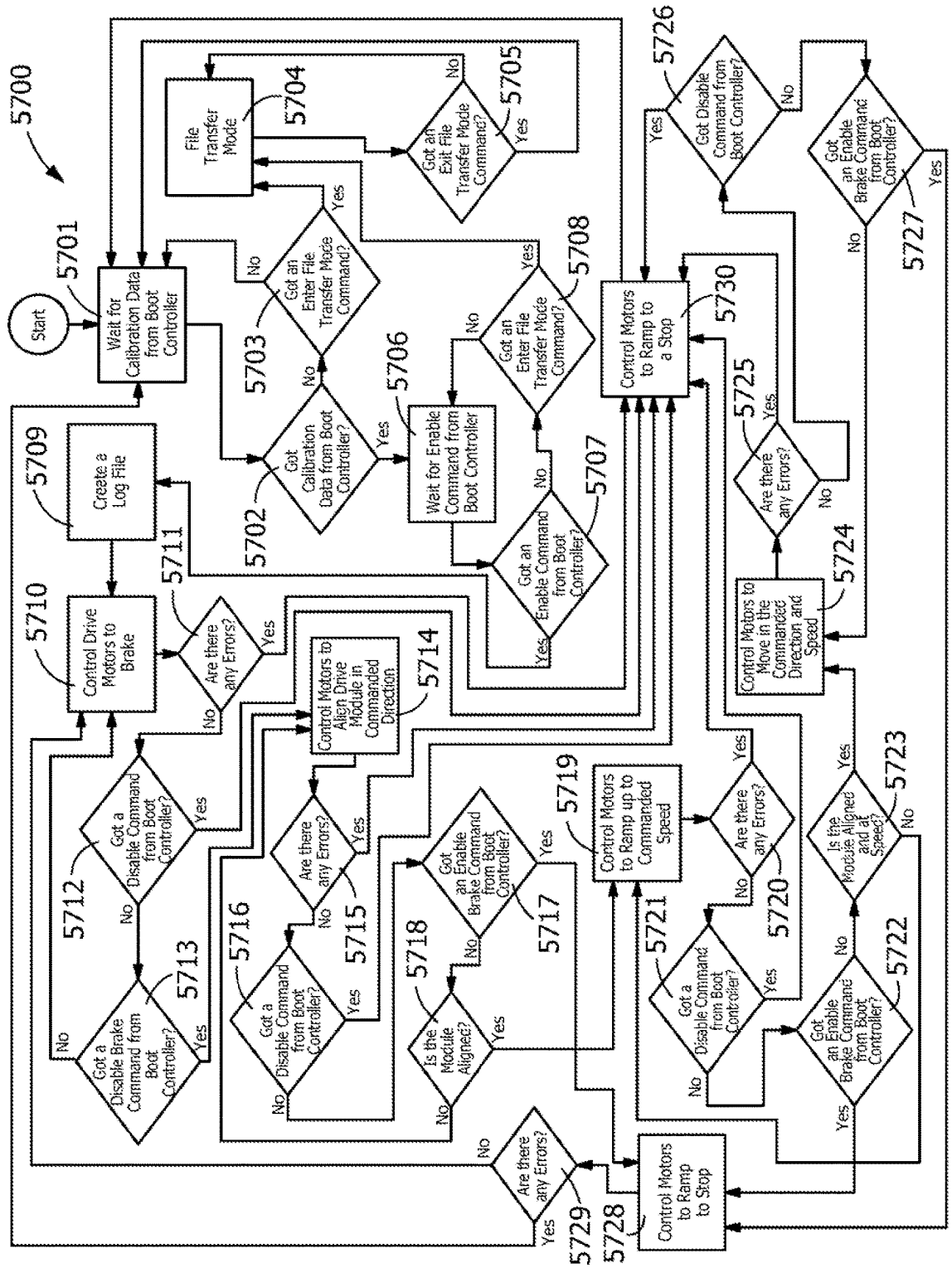
FIG. 24 is a flowchart that details the execution of a drive module.

Flowchart 5700 in FIG. 24 describes the operation of the drive module 1150 that powers the motors 1157 and 1158 to move depending on commands that are received over serial from the boot controller 1120. When the drive module 1150 is first turned on, it will command the motors 1157 and 1158 to brake, while waiting for calibration data from the boot controller 1120 in step 5701. After the drive module 1150 has received calibration from the boot controller 1120 in step 5702, it will wait for an enable command from the boot controller in step 5706 and 5707. The calibration data may also exist in persistent memory that exists on the boot controller or the drive module 1150 itself. While the drive module 1150 is waiting for a command from the boot controller 1120, the drive module 1150 can be commanded over USB to enter a file transfer mode to transfer log files off of the drive module to the computing device as shown in steps 5703, 5704, 5705, and 5708. After the drive module 1150 has received an enable command from the boot controller 1120 as checked in step 5707, it will create a log file in step 5709, and then command the motors 1157 and 1158 to brake in step 5710. While the drive module 1150 is enabled, and if there are any detected errors as checked in steps 5711, 5715, 5720, 5725, and 5729, or if the disable command is received from the boot controller 1120 as checked in steps 5712, 5716, 5721, and 5726, the drive module 1150 will control the motors 1157 and 1158 to ramp to a stop in step 5730, and then return to waiting for calibration data from the boot controller 1120 in step 5701. While the drive module 1150 commands the motors 1157 and 1158 to brake in step 5710, if a disable brake command is received from the boot controller 1120 as checked in step 5712, then the drive module 1150 will control the motors 1157 and 1158 to align the module 1150 in the commanded direction from the boot controller 1120 in step 5714. After the drive module 1150 is aligned with the commanded direction as checked in step 5718, the drive module 1150 will control the motors 1157 and 1158 to ramp up to move the module 1150 at the commanded speed from the boot controller 1120 in step 5719. Once the module 1150 has reached the desired speed and direction as checked in step 5723, it will control the motors 1157 and 1158 to move the module 1150 in the commanded direction and speed from the boot controller 1120 in step 5724. If an enable brake command is received from the boot controller 1120 when the drive module 1150 is commanding the motors 1157 and 1158 to move as checked in steps 5717, 5722, and 5727, the drive module 1150 will control the motors 1157 and 1158 to ramp down to a stop in step 5728, and then return to step 5710 to command the motors 1157 and 1158 to brake.

Figure 25:
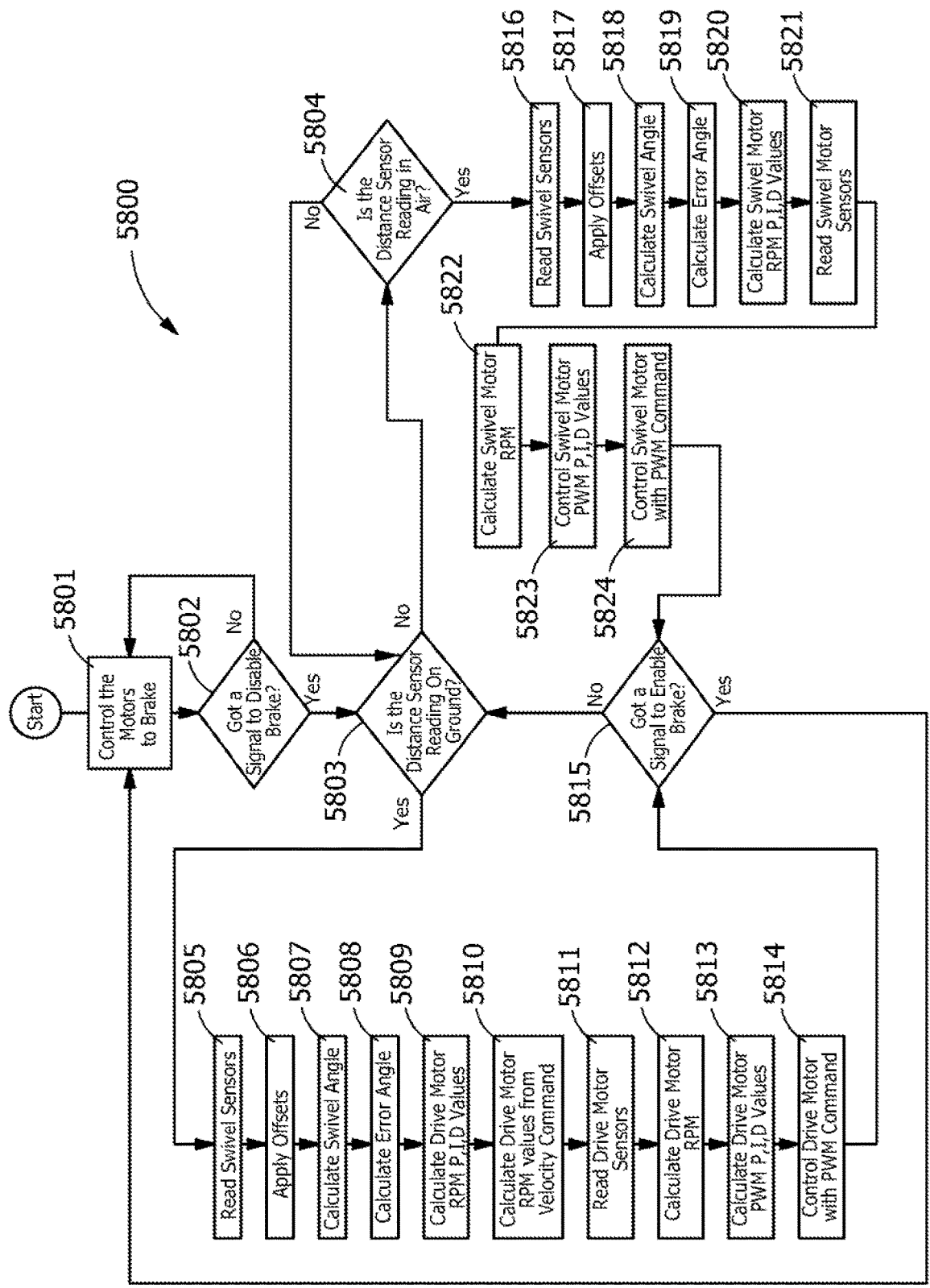
FIG. 25 is a flowchart that details the execution of the motor control system that the drive module uses to control its orientation and velocity.

Flowchart 5800 in FIG. 25 describes the operation of how the drive module 1150 controls the drive 1158 and swivel motors 1157 when the drive module 1150 is actively controlling the speed and direction of its motion. When the drive module 1150 is commanded to brake from the boot controller 1120, it will control the motors 1157 and 1158 to actively resist motion in step 5801. If the drive module 1150 receives a signal to disable braking from the boot controller 1120, as checked in step 5802, the drive module 1150 will move to step 5803. If the distance sensor, also described as the ground proximity sensor 11504, reads that the drive module 1150 is on the ground in step 5803, the module will control the drive motors 1158 in steps 5805 through 5814. The drive module 1150 will first read the swivel sensor, also described as the rotation position sensor 11501 in FIG. 3, in step 5805 to obtain the current rotational position of the sensor 11501. Then in step 5806, the drive module 1150 applies calibration offsets obtained either from boot controller 1120 or from onboard persistent memory to the measured rotational position from sensor 11501 in step 5806. The module 1150 will then calculate the measured rotational position of the module 1150 in step 5807. Then in step 5808, the angle error is calculated by the drive module 1150 from the measured angle, and the commanded angle from the boot controller 1120. In addition, the commanded angle from the boot controller 1120 can be rate limited with a trajectory planner based on a maximum allowed angular velocity and angular acceleration. From the error, desired drive motor 1158 RPM values are calculated with a closed PID control loop in step 5809. From the velocity command from the boot controller 1120, an open loop desired drive motor 1158 RPM value is calculated in step 5810. The desired RPM from the velocity command and the desired RPM from the angle command are combined as a total desired RPM for each drive motor 1158. Wheel load sensing could be used to modify this desired RPM value in reaction to variations in traction on the wheels 4340. Then the drive motor speed sensors 1159 are read in step 5811 to calculate the current RPM of each drive motor 1158 in step 5812. From the desired RPM and the current RPM values, the commanded PWM values are calculated with a closed PID control loop that includes a feedforward open loop PWM value that is calibrated for each motor 1158 in step 5813. The drive module then controls the drive motor controllers with the calculated PWM value in step 5814. If the distance sensor reads that the drive module is in the air in step 5804, then the module 1150 will control the swivel motors 1157. The drive module 1150 will read the swivel sensor, apply calibration offsets, and then calculate the measured angle in steps 5816, 5817, and 5818 similarly to steps 5805, 5806, and 5807. Then the angle error is calculated from the measured angle, and the commanded angle in step 5818. In addition, the commanded angle from the boot controller 1120 can be rate limited with a trajectory planner based on a maximum allowed angular velocity and angular acceleration. From the error, desired swivel motor 1157 RPM values are calculated with a closed PID control loop in step 5820. Then the swivel motor sensors 1159 are read in step 5821 to calculate the current RPM of each swivel motor 1157 in step 5822. From the desired RPM and the current RPM values, the commanded PWM values are calculated with a closed PID control loop that includes a feedforward open loop PWM value that is calibrated for each motor 1157 in step 5823. The drive module 1150 then controls the swivel motor controllers with the calculated PWM value in step 5824. If the drive module 1150 is commanded to enable braking while the motors 1157 and 1158 are being actively controlled as checked in step 5815, the drive module will move to step 5801 and brake the motors 1157 and 1158. Another embodiment of flowchart 5800 will command the drive motors 1158 to drive at the open loop RPM calculated from the velocity command when the distance sensor reads that the drive module is in the air in steps 5816 through 5824. In addition, when the distance sensor reads that the drive module is on the ground, the swivel motor(s) 1157 will be commanded to a desired RPM to rotate the module in steps 5805 through 5814.

Another embodiment of flowchart 5800 will communicate with separate motor controllers to drive the motors over a serial interface instead of PWM.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the robotic virtual reality footwear system and methods, as shown in the various exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A method for controlling a pair of robotic boots worn by a user in a virtual reality (VR) system, comprising:
   measuring a pose data of the user and the pair of robotic boots;
   determining if the user is outside of an exit area, and in response to determining that the user is outside of the exit area:
   calculating an intended velocity of the user;
   calculating a motion of the boots to counteract the intended velocity of the user;
   calculating the motion of the boots to move the user into an entry area;
   calculating a total desired motion of the pair of robotic boots;
   calculating a motion command in response to the measured pose data and the total desired motion;
   sending a boot motion command to the pair of robotic boots;

calculating drive module motion commands from the boot motion command and drive module data;

sending the drive module motion commands to a drive module;

controlling a plurality of drive module motors in response to the drive module motion commands; and moving the user in virtual reality with the intended velocity.

2. The method of claim 1, further comprising:

determining if the user requested a system stop command; and transmitting a signal to the user that the system is ramping to a stop state in response to a user requested system stop command.

3. The method of claim 2, further comprising:

in response to not determining a system stop command request, detecting if a stop condition is detected; and in response to detecting a stop condition, transmitting a signal to the user that the system is ramping to a stop state.

4. The method of claim 3, further comprising determining if the user is positioned in the entry area; and in response to determining that the user is positioned in the entry area, transmitting a command signal to the pair of robotic boots to apply brakes.

5. The method of claim 4, further comprising returning to the step of measuring pose data.

6. The method of claim 1, further comprising:

starting from an idle state, actively braking the pair of boots;

requesting a start signal;

determining if the VR system is ready; and in response to determining that the system is ready transmitting a signal to the user that the system is ready; and initializing system parameters.

7. The method of claim 1, further comprising:

commanding the system to apply a braking signal to the pair of robotic boots in response to determining that the user is standing still in the entry area; and returning to the step of measuring the pose data.

8. The method of claim 1, further comprising:

in response to measuring the pose data and determining that the user is inside the exit area before the boots have been commanded to move, commanding the system to apply a braking signal to the pair of robotic boots.

9. The method of claim 1, further comprising:

in response to transmitting a signal to the user that the system is ramping to a stop state: ramping the system to a stopped state; and transmitting a braking signal to the pair of robotic boots.

10. The method of claim 1, wherein the step of measuring the pose data is based on a virtual reality tracking data.

11. A system for controlling movement of a user via a pair of robotic boots, the system comprising:

a virtual reality (VR) system in data communication with a computing device and a pair of robotic boots;

a base station in data communication with the computing device and with the pair of robotic boots;

measure a pose data of the user and the pair of robotic boots; and a processor configured to:

determine if the user is outside of an exit area, and in response to the user being outside of the exit area:

calculate an intended velocity of the user;

calculate a motion of the boots to counteract the intended velocity of the user;

calculate the motion of the boots to move the user into the entry area;

calculate a total desired motion of the pair of robotic boots;

calculate a motion command in response to the measured pose data and the total desired motion;

send a boot motion command to the pair of robotic boots;

calculate drive module motion commands from boot motion command and drive module data;

send the drive module motion commands to a drive module;

control a plurality of drive module motors in response to the drive module motion commands; and move the user in virtual reality with the intended velocity.

12. The system of claim 11, further comprising:

a tracking harness, the tracking harness adapted to be worn by the user;

the tracking harness in wireless communication with the VR System and configured to provide the user pose data to constrain the user location within a VR workspace; and wherein the base station being configured to receive data from the computing device, and communicate commands to the robotic boots, receive data from the robotic boots, and communicate VR motion commands to the computing device.

* * * * *